United States Patent
Fuchs et al.

(12) 
(10) Patent No.: US 6,484,097 B2
(45) Date of Patent: Nov. 19, 2002

(54) WIDE AREA INVERSE DIFFERENTIAL GPS

(75) Inventors: Donald L. Fuchs, Wyckoff, NJ (US); Charles Abraham, San Jose, CA (US); Frank van Diggelen, San Jose, CA (US)

(73) Assignee: Global Locate, Inc., San Jose, CA (US)

( * ) Notice: Subject to any disclaimer, the term of this patent is extended or adjusted under 35 U.S.C. 154(b) by 0 days.

(21) Appl. No.: 09/996,156

(22) Filed: Nov. 28, 2001

(65) Prior Publication Data

US 2002/0072855 A1 Jun. 13, 2002

Related U.S. Application Data

(63) Continuation of application No. 09/553,930, filed on Apr. 21, 2000.
(60) Provisional application No. 60/130,882, filed on Apr. 23, 1999.

(51) Int. Cl.[7] .......................... G01C 21/00; H04B 7/185
(52) U.S. Cl. ...................... 701/213; 701/214; 342/450
(58) Field of Search ................................ 701/213, 214, 701/215, 207, 226; 342/357.01, 357.06, 357.08, 357.09, 357.1, 357.02, 451, 463, 357.12, 450, 352, 378

(56) References Cited

U.S. PATENT DOCUMENTS

| | | | | |
|---|---|---|---|---|
| 3,715,758 A | * | 2/1973 | Sender | 343/112 R |
| 4,030,033 A | * | 6/1977 | Bibl et al. | 325/30 |
| 4,941,155 A | * | 7/1990 | Chuang et al. | 375/84 |
| 5,148,179 A | * | 9/1992 | Allison | 342/357 |
| 5,379,224 A | | 1/1995 | Brown et al. | 364/449 |
| 5,621,646 A | | 4/1997 | Enge et al. | 364/449 |
| 5,726,659 A | * | 3/1998 | Kee et al. | 342/352 |
| 5,781,156 A | | 7/1998 | Krasner | 342/357 |
| 5,812,087 A | | 9/1998 | Kranser | 342/357 |
| 5,825,327 A | | 10/1998 | Krasner | 342/357 |
| 5,828,336 A | | 10/1998 | Yunck et al. | 342/357 |
| 5,831,574 A | | 11/1998 | Krasner | 342/357 |
| 5,841,396 A | | 11/1998 | Krasner | 342/357 |
| 5,874,914 A | | 2/1999 | Krasner | 342/357 |
| 5,884,214 A | | 3/1999 | Krasner | 701/207 |
| 5,893,044 A | * | 4/1999 | King et al. | 701/214 |
| 5,899,957 A | * | 5/1999 | Loomis | 701/214 |
| 5,907,809 A | * | 5/1999 | Molnar et al. | 455/456 |
| 5,913,170 A | * | 6/1999 | Wortham | 455/457 |
| 5,920,278 A | * | 7/1999 | Tyler et al. | 342/33 |
| 5,936,572 A | * | 8/1999 | Loomis et al. | 342/357 |
| 5,945,944 A | | 8/1999 | Krasner | 342/357.06 |

(List continued on next page.)

FOREIGN PATENT DOCUMENTS

| | | | | |
|---|---|---|---|---|
| WO | WO 99/56144 | 11/1999 | | G01S/5/14 |

*Primary Examiner*—Tan Nguyen
*Assistant Examiner*—Dalena Tran
(74) *Attorney, Agent, or Firm*—Moser, Patterson & Sheridan, LLP

(57) ABSTRACT

A method and apparatus for locating mobile device over a broad coverage area using a wireless communications link that may have large and unknown latency. The apparatus comprises at least one mobile device, a reference network, a position server, a wireless carrier, and a location requester. The mobile device is in communication with the wireless carrier and receives global positioning system (GPS) signals from a plurality of satellites in the GPS satellite constellation. The reference network is coupled to the position server and provides GPS data. The mobile receiver receives GPS signals, performs rudimentary signal processing and transmits the processed signals to the wireless carrier. The wireless carrier passes the signals on to the position server. The position server processes the mobile receiver's GPS data and the reference network ephemeris data to identify the location of the mobile receiver. The location is sent to the location requester.

20 Claims, 13 Drawing Sheets

U.S. PATENT DOCUMENTS

| | | | | |
|---|---|---|---|---|
| 5,999,124 A | * | 12/1999 | Sheynblat | 342/357.09 |
| 6,002,363 A | | 12/1999 | Krasner | 342/357.1 |
| 6,016,119 A | | 1/2000 | Krasner | 342/357.06 |
| 6,023,477 A | * | 2/2000 | Dent | 370/509 |
| 6,052,081 A | | 4/2000 | Krasner | 342/357.02 |
| 6,051,018 A | | 5/2000 | Sheyblat | 342/357.06 |
| 6,064,336 A | | 5/2000 | Krasner | 342/357.05 |
| 6,075,987 A | * | 6/2000 | Camp, Jr. et al. | 455/427 |
| 6,121,923 A | * | 9/2000 | King | 342/357.12 |
| 6,122,506 A | | 9/2000 | Lau et al. | 455/427 |
| 6,133,874 A | * | 10/2000 | Krasner | 342/357.15 |
| 6,185,427 B1 | * | 2/2001 | Krasner et al. | 455/456 |
| 6,243,587 B1 | * | 6/2001 | Dent et al. | 455/456 |
| 6,252,545 B1 | | 6/2001 | Da et al. | 342/357.1 |
| 6,289,041 B1 | | 9/2001 | Krasner | 375/152 |
| 6,289,280 B1 | | 9/2001 | Fernandez-Corbaton et al. | 701/214 |
| 6,295,023 B1 | | 9/2001 | Bloebaum | 342/357.06 |
| 6,295,024 B1 | | 9/2001 | King et al. | 342/357.12 |
| 6,313,786 B1 | * | 11/2001 | Sheynblat et al. | 342/357.02 |
| 6,324,474 B1 | * | 11/2001 | Beisner et al. | 701/215 |

* cited by examiner

WIDE AREA INVERSE DIFFERENTIAL GPS

CROSS REFERENCE TO RELATED APPLICATIONS

This application is a continuation of pending U.S. patent application Ser. No. 09/553,930, filed Apr. 21, 2000, entitled "METHOD AND APPARATUS FOR LOCATING AND PROVIDING SERVICES TO MOBILE DEVICES", which claims benefit of U.S. provisional patent application Ser. No. 60/130,882, filed Apr. 23, 1999, both of which are hereby incorporated by reference in their entirety.

BACKGROUND OF THE INVENTION

1. Field of Invention

The present invention relates to mobile wireless devices as used in personal and asset location systems. In particular, the present invention relates to a method and apparatus for utilizing the Global Position System (GPS) to locate objects over a large geographic region and to provide information or services related to a real time position of the object.

2. Description of the Background Art

With the advent of the Global Positioning System (GPS), there is growing demand for mobile devices that can locate and track children, the elderly, emergency situations, tourists, security, valuable assets, and the like. Devices built using conventional GPS receivers have been developed by a number of companies. These current generation of devices have major limitations in terms of indoor penetration, power consumption, accuracy, and acquisition time.

To address the above issues new GPS processing architectures have evolved that utilize a combination of mobile GPS receivers and fixed GPS infrastructure communicating via wireless links. Systems with this architecture collect the majority of the data for location using the fixed infrastructure and, compared to traditional GPS, are able to offer large improvements in accuracy, indoor penetration, acquisition time, and power consumption. Thus far, such systems are based upon a fixed site GPS receiver that is physically located in the local vicinity of the mobile receiver and are therefore difficult to extend to broad coverage areas without a large proliferation of fixed site GPS receivers. Furthermore, such systems require a wireless link which provides communication in real-time and therefore such systems cannot take advantage of non real-time messaging systems such as paging networks.

Thus there is a need for a GPS processing architecture and device technology that provides the benefits of improved accuracy, indoor penetration, acquisition time, and power consumption and also offers the capability to function over large geographic coverage areas without requiring a fixed site GPS receiver in the local vicinity of the mobile device. Furthermore, to take advantage of broad coverage messaging systems, the architecture should have the ability to operate over a link which is not real-time, i.e. a link where there is significant and possibly unknown message latency.

SUMMARY OF THE INVENTION

The invention provides a method and apparatus for locating a mobile device over a broad coverage area using a wireless communications link that may have large and unknown latency. The apparatus comprises at least one mobile device containing global positioning system (GPS) processing elements, a GPS reference network comprising a plurality of fixed site GPS receivers at known locations, a position server with software that executes GPS processing algorithms, a wireless communications link, and at least one location requester.

The method consists of using GPS measurements obtained at the fixed site GPS receivers to build a real time model of the GPS constellation which includes models of satellite orbits, satellite clocks, and ionosphere and troposphere delays. The model is used by algorithms within the position server to create an initialization packet used to initialize GPS processing elements in the mobile devices. Once initialized, the GPS processing elements detect and measure signals from the GPS satellites. The measurements made are returned to the position server, where additional software algorithms combine the information with the real-time wide area model of the GPS constellation to solve for the position of the mobile device. The computed position is then provided to the location requestor.

The system design is such that messages to and from the mobile device can be delayed in time by an unknown amount as would be the case for a non real-time communication system. Furthermore, only a small number of fixed site GPS receivers are required in the system and there is no requirement to have a fixed site GPS receiver in the local region of the mobile device.

The GPS processing elements in the mobile devices include a highly parallel GPS correlator that is capable of searching and detecting signals over a wide range of unknown signal delays. The highly parallel nature of the GPS processing allows the system to use long averaging periods which are impractical for a conventional GPS receiver that searches for signals sequentially using a small number of correlators. The long averaging times are made possible by the parallel correlation that allow the system to locate objects in difficult signal environments, such as inside buildings, where conventional GPS cannot function.

Furthermore, the system design is such that the GPS processing elements in the mobile devices are responsible for making only an instantaneous measurement of the sub-millisecond PN code phases of the received signals, and do not collect GPS navigation data or time tag information. Conventional GPS receivers, by contrast, require a long time period (typically one minute or more) of continuous and strong signal reception in order to acquire navigation data and timing. Thus, the system produces fixes much more quickly than a conventional GPS and can do so in environments where signals are relatively weak and unstable.

The overall architecture supports many different user models. Specifically, the location requestor may be the user of the mobile device or a different entity such as a Internet terminal or an emergency assistance center.

BRIEF DESCRIPTION OF DRAWINGS

The teachings of the present invention may be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
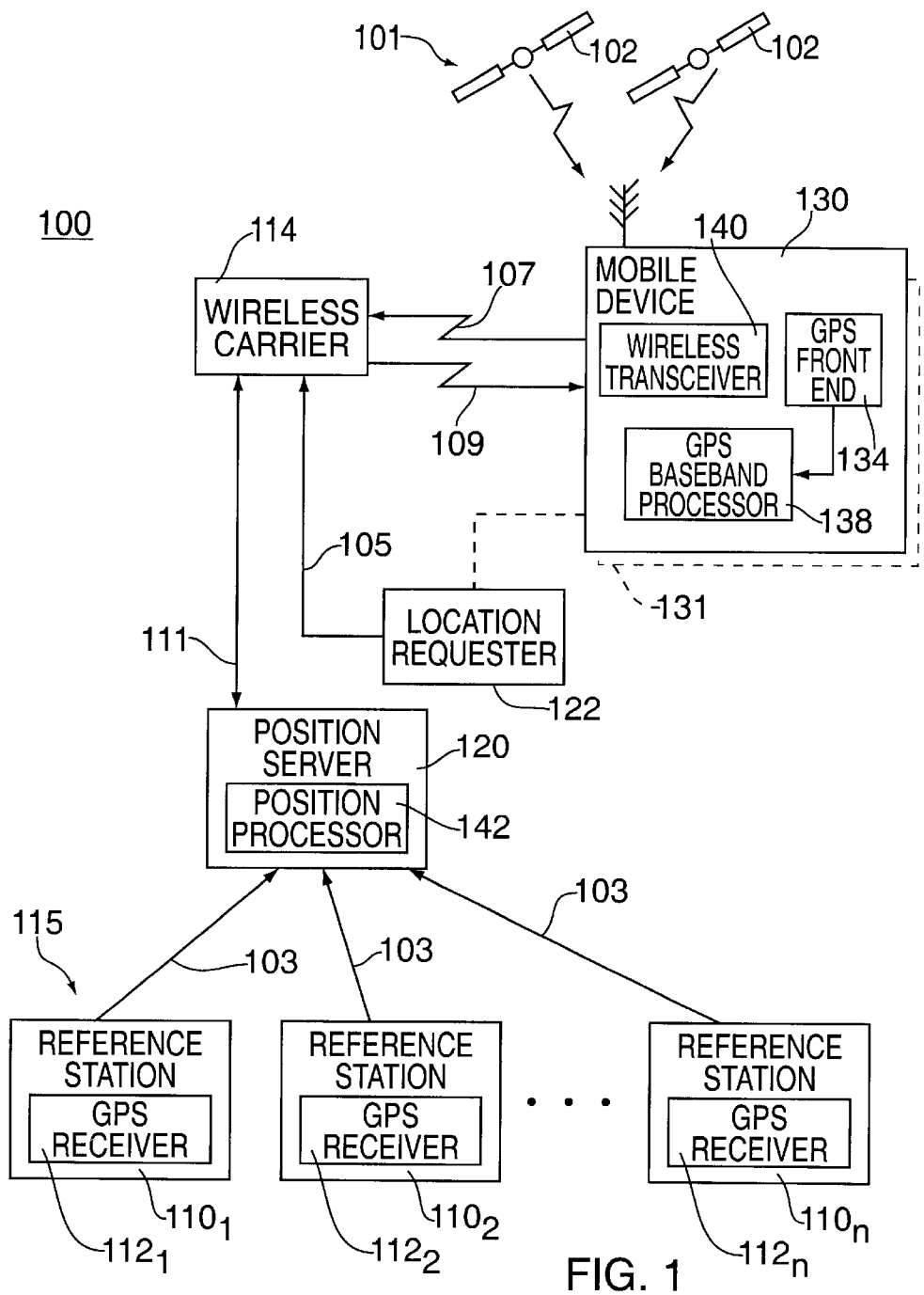
FIG. 1 depicts a block diagram of an object locating system.

To facilitate understanding the description has been organized as follows:

Overview, introduces each of the components of the invention, and describes their relationship to one another.

Wide Area Model, describes the formation of the model of the GPS constellation.

Initialization packet, describes how data from the wide area model is used by the mobile device to accelerate signal detection.

Convert PN code phases to full pseudo-range, describes how the full pseudo-ranges are calculated at the server from the sub-millisecond code phases measured at the mobile device.

Compute position, describes how the server computes the mobile device position, and time of measurement.

Fault detection, describes how the server identifies errors, particularly incorrect integer values in the pseudo-ranges.

Stored almanac model, describes an alternative method for providing the initialization information for accelerated signal detection.

Compact orbit model, describes an alternative method for providing the initialization information for accelerated signal detection. This alternative can be used by mobile devices that compute their own position.

Software implementation of the parallel GPS correlator, described one embodiment of a parallel GPS correlator used for detection and measurements of GPS signals at a mobile device.

Hardware implementation of the parallel GPS correlator, described a second embodiment of a parallel GPS correlator used for detection and measurements of GPS signals at a mobile device.

Overview

The invention provides a method and apparatus for locating a mobile device over a broad coverage area using a wireless communications link that may have large and unknown latency. The apparatus comprises at least one mobile device containing global positioning system (GPS) processing elements, a GPS reference network comprising a plurality of fixed site GPS receivers at known locations, a position server with software that executes GPS processing algorithms, a wireless communications link, and at least one location requester.

The method consists of using GPS measurements obtained at the fixed site GPS receivers to build a wide area model of the GPS constellation that includes real-time models for satellite orbits, satellite clocks, and ionosphere and troposphere delays. The wide area model is used by algorithms within the position server to create initialization information that is sent to the mobile devices. The GPS processing elements in the mobile devices use the initialization information, together with mobile clock information, to generate pseudo-range and pseudo-range rate predictions that allow the parallel GPS correlator to rapidly detect and measure the PN code phase delays from a plurality of satellites. The PN code phase delays are returned to the position server, where additional software algorithms combine the information with the wide area model to solve for the position of the mobile device. It should be noted that solving for position requires only the sub-millisecond PN code phases from the mobile device, enabling the mobile device to obtain the necessary measurement data much more quickly than would be possible if full pseudo-ranges were needed.

The initialization information can take on several forms. In one embodiment, the initialization information consists of models of the changing pseudo range between the mobile device and each of a plurality of satellites. The pseudo range models, after being suitably adjusted for the effects of the clock in the mobile device, are used to generate pseudo range and pseudo range rate predictions for the parallel GPS correlator. The models are useful over long time spans, to allow for latency in receipt of the initialization packet by the mobile device.

In another embodiment, the initialization information consists of a compact orbit model that is used by the mobile device in a similar manner to generate pseudo range and pseudo range rate predictions. An advantage of this approach is that the orbit model also carries information sufficient for the mobile device to compute position without returning measurements to the position server.

In another embodiment, the initialization information consists of delta corrections that are used by the mobile device to correct pseudo range and pseudo range rate predictions that are computed from an almanac stored in the mobile device.

In all of the embodiments, the models and/or predictions of pseudo range and pseudo range rate are adjusted for the affect of the mobile device clock. The adjustment is created using tracking information in the mobile device's wireless receiver which tracks a wireless carrier signal that is itself synchronized to GPS.

FIG. 1 depicts a block diagram of a first embodiment of a personal and asset location system (PALS) 100. The PALS 100 uses a Global Positioning System (GPS) 101 (or other similar satellite position location system) having a plurality of satellites 102 orbiting the earth. PALS 100 comprises a reference station network 115 comprising a plurality of geographically dispersed reference stations where each reference station comprises a fixed site GPS receivers $110_1$ through $110_n$ (collectively fixed site GPS receiver 110), a position server with software that executes GPS processing algorithms 120 and a plurality of mobile devices 130. The mobile devices 130 are coupled to or otherwise associated with an object that is to be located, e.g., mobile object 131 including personal assets, equipment, persons and the like. The mobile devices 130 communicate with the position server 120 via a wireless carrier 114. Each reference station 110 further comprises a conventional GPS receiver $112_1$ through $112_n$ (collectively conventional GPS receivers 112) located at a precisely known locations. For example, for a global network, the network may comprise just a few stations to observe all satellites at all times, with more stations added to further improve the model of the GPS constellation. Each of the conventional GPS receivers 112 is coupled to the position server 120 via a network communications link 103.

In one embodiment, the position server 120 is utilized to determine the location of the mobile receiver 130. The mobile device 130 contains a wireless communications transceiver 140 that enables the receiver to communicate with the position server 120 through the wireless carrier 114. One embodiment of the invention uses a duplex wireless protocol to communicate with the mobile device 130 via links 107 and 109 (an application of the invention is further described with reference to FIG. 8 below). The wireless carrier communicates with the server through a conventional communication network 111.

As discussed below, the device 130 comprises a wireless transceiver 140, a GPS receiver front end 134, and a GPS signal processor 138. The GPS signal processor 138 includes a highly parallel GPS correlator and associated software to perform various algorithms described below. The mobile device 130 receives initialization data from the position server 120 through the wireless link 109, collects certain GPS signal information, processes that information and sends the processed information through link 107 to the wireless carrier 114. The wireless carrier 114 transmits the information through link 111 to the position server 120. In one embodiment, the position server 120 processes the GPS information from the device 130 to determine the device's location. A location requestor 122 can then request the receiver's location through a number of communications paths 105, e.g., dial up access, Internet access, wired land line and the like. The location requestor can also be the user of the mobile device in which case location requests could also be communicated through the wireless carrier.

The conventional fixed site GPS receivers 112 of the reference station network 115 transmit GPS measurements received from all the visible satellites 102. The data is transmitted from each conventional GPS receiver 112 to the position server 120. For example, the data may be transmitted through the reference station network 115 via a router and dedicated landline (e.g., ISDN, T1, T2, and the like) or in TCP/IP format over the Internet to a hub at the position server 120. The communication network components are represented by links 103. Thereafter, the position server 120 is responsible for computing the position of the mobile device 130 by using in part, the GPS data transmitted across the reference station network 115.

Wide Area Model

In order to determine the position of the mobile device 130, the PALS 100 utilizes a wide area inverse differential GPS technique to locate the mobile device 130. Specifically, the position server 120 uses the reference network 115 information to build a real-time wide area model of the GPS constellation which includes estimates of satellite orbits, satellite clocks, ionosphere and troposphere delays. The wide area model is used for two purposes. First, the model is used to generate an initialization packet that is transmitted to the mobile device and is used by the GPS signal processor to help detect and measure the GPS satellite signals. Second, the model is used together with the PN code phase values from the mobile device 130 to solve for the position of the mobile device 130.

Figure 2A:
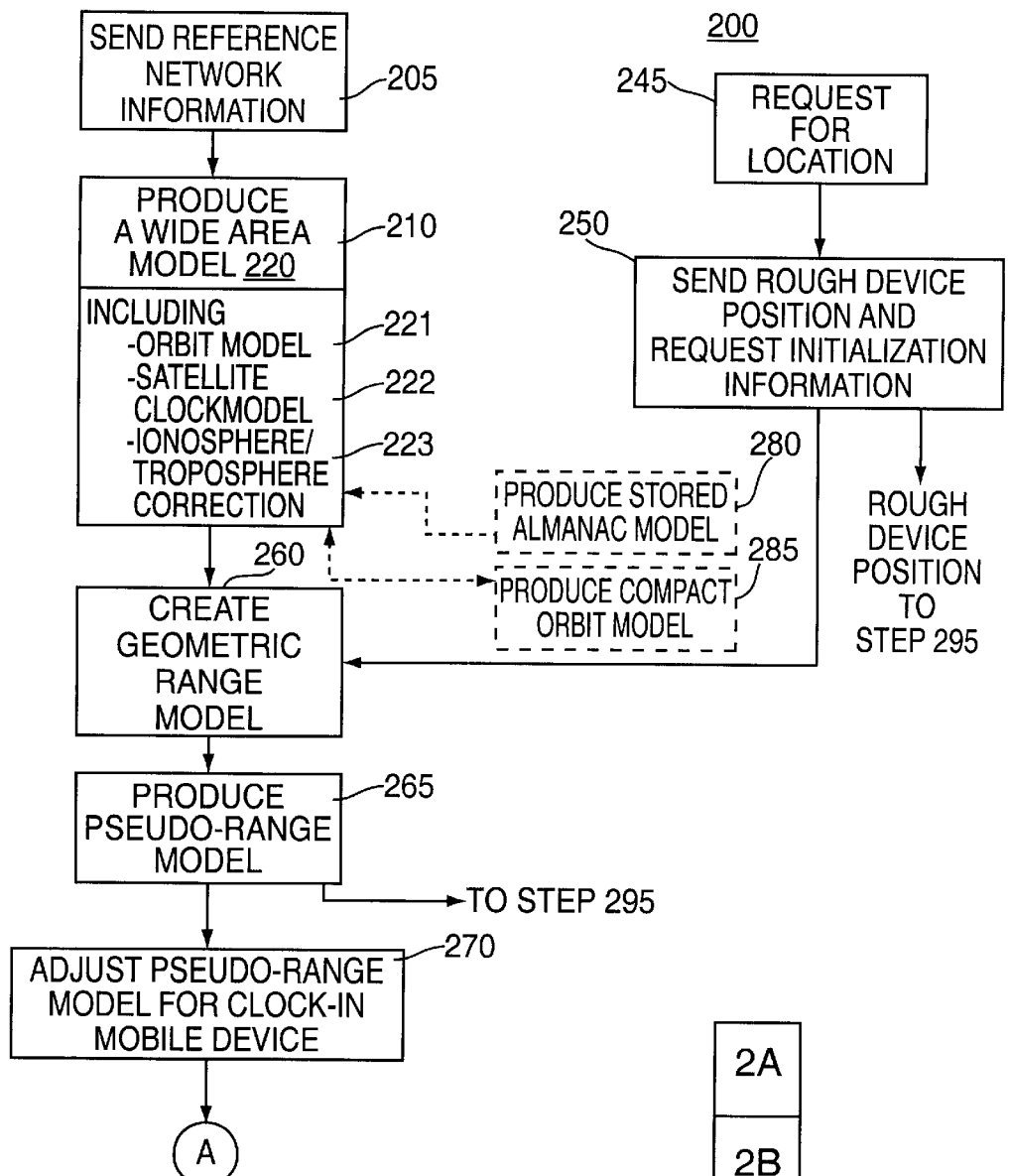
FIGS. 2A and 2B together depict a flow diagram of a first embodiment of a method for locating a mobile device.
Figure 2B:
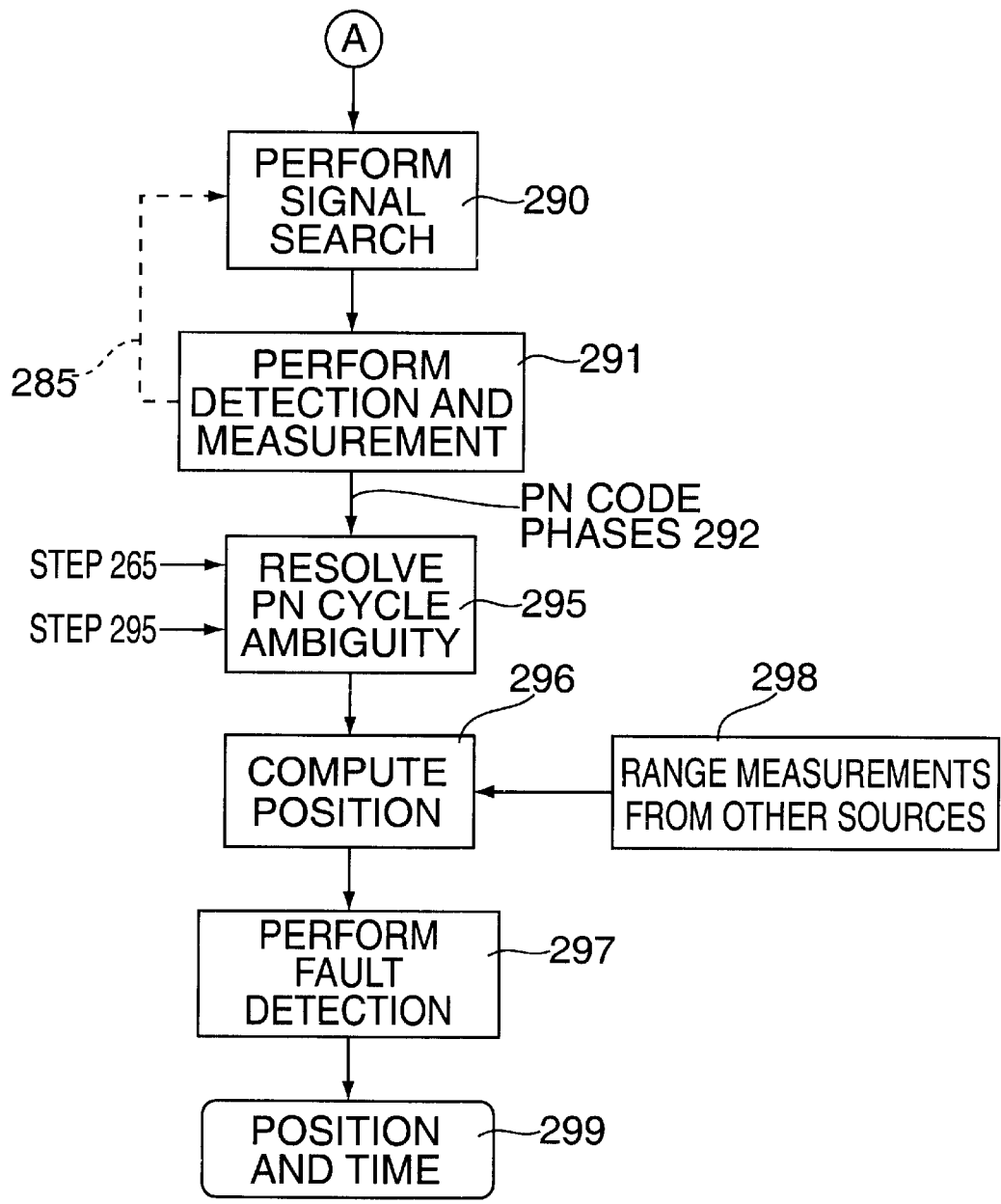

FIG. 2 depicts the proper alignment of FIGS. 2A and 2B. FIGS. 2A and 2B, taken together, depict a flow diagram of a first embodiment of a PALS processing method 200 for locating a mobile device. In step 205, the GPS measurements from GPS receivers 112 of the reference station network 115 are sent to the position server 120. At step 210, the position server 120 combines a plurality of GPS satellite 112 measurements to produce a wide area model 220 that is used to generate real-time estimates of parameters related to the GPS system including satellite orbits 221, satellite clocks 222, and a geometric model of the atmospheric delay 223. The atmospheric delay models 223 are useful within the geographic region spanned by the reference network 115. The orbit and satellite modeling information 221, 222 is provided for all satellites and is useful for any mobile device 130. In one embodiment of the invention, the parameters are estimated by a Kalman filter that iteratively converges upon a large number of parameters that form a least squares fit to the data observed at each reference station 110. These wide area modeling techniques are well known in the industry. When used in this embodiment, these wide area modeling techniques provide accuracy and the ability to predict satellite signals over a broad coverage region using a relatively small number of receivers 112 in the reference network 115. Thus, one advantage of utilizing the wide area differential GPS technique is that the reference stations 110 in the network 115 can be spaced further apart than would be required with conventional DGPS. This means that, to achieve an accurate position for the mobile device, no fixed site GPS receiver is required in the vicinity of the mobile device.

Additionally, since the creation and maintenance of the model occurs once and is usable for all mobile device positions, the technique is computationally efficient when large number of mobile devices 130 must be serviced concurrently.

Initialization Packet

To determine the position of an object 131, a location request is received at step 245 for the position of a mobile device 130. At step 250, the wireless carrier 114, in turn, sends a request to the position server 120 requesting initialization information for the GPS processing in the mobile device 130. This request is accompanied by a rough estimate of position 250 for the mobile device 130.

The approximate position of the mobile device 130 is provided by the wireless carrier 114 to the position server 120 through a conventional link 111. In a cellular phone system, for example, this information can be derived from knowledge of the particular cellular base station being used to communicate with the mobile device 130. Similarly, in a 2-way paging system, the registration of the pager into a market service area provides the wireless carrier 114 with a rough idea of the position of the mobile device.

The position server makes use of the rough estimate of position 250 and the wide area model 220 to create an initialization packet that is transmitted to the mobile device. The mobile device uses the initialization packet to calculate the expected satellite ranges and range rates. These will be used to drive the parallel GPS correlator in order to accelerate signal detection and measurement.

The range and range rates of a satellite signal, as measured by the mobile device, are also affected by time and frequency referencing errors in the mobile device. Conventional GPS receivers address this uncertainty either by searching over a large range of possible frequencies and possible code-delays, or by tuning or steering the mobile device oscillator with an accurate external reference. As described below, the invention uses a novel technique to adjust the information in the initialization packet for the mobile clock error, avoiding the need for a large search or a steered/tuned oscillator.

One embodiment of the initialization packet is a pseudo-range model, described in FIG. 2A. To create the pseudo-range model, the server first creates a geometric-range model at step 260. In one embodiment this is done by taking the norm of the vector from the rough estimate of mobile device position to the real-time estimate of satellite position 221 supplied by the wide area model.

$$\text{range}_i = |\text{satellite\_position}_i - \text{mobile\_device\_position}| \qquad (1)$$

To create the pseudo-range model, at step 265, the position server 120 adjusts the geometric-range model to account for the effect of the satellite clock error 222 and the ionosphere/troposphere correction. To include the effect of the satellite clock error the range is adjusted by an amount equal to the satellite clock error multiplied by the speed of light. To include the effect of the ionosphere/troposphere error, the range is further adjusted by an amount equal to the ionosphere/troposphere delay, in the vicinity of the mobile device, multiplied by the speed of light.

The pseudo-range model thus created is valid at a specific time. In one embodiment, to make the model valid over a longer period of time, the server calculates a similar model at several different times and then does a polynomial fit to the data to create a model parameterized in three terms, a, b, and c, for each satellite. A valid model can be obtained at some later time (dt) as follows:

$$\text{pseudo\_range}_i(t+dt) = a_i + b_i \cdot dt + c_i \cdot dt^2 \qquad (2)$$

This allows the method to be used with systems that have large and unknown latency in the communication link, so that the mobile device will need to apply the model as some later time.

It is understood that there are many other mathematical techniques that can be employed. In general, the number of terms and precision required in the delay model will be a function of the desired accuracy for the model as well as the time span over which the model will be used. For example, a third order polynomial fit is accurate enough to provide models of the delay that are sufficiently accurate to assist the GPS signal processing in the mobile device over periods of several minutes.

The pseudo-range model provides for estimating the delay of a signal from the satellite and the changes in delay over time, allowing the GPS signal processing to generate both time and frequency predictions for the GPS satellite signal at the mobile device 130.

The pseudo-range model provides the mobile device with two separable pieces of information. The pseudo-range value tells the mobile device what code phase to expect from each satellite, and the rate of change of pseudo-range tell the rate of change of the code- and carrier phase. In some systems it may be desirable to take advantage of the rate of change information only. In this case the term $a_i$ may be ignored from the model in equation (2).

Referring to FIG. 2A, the pseudo-range models are next adjusted for the clock in the mobile device. One embodiment of the adjusted model is an adjusted pseudo-range model, formed as follows: a model A, B, C is formed for the mobile device clock error $$\text{clock\_error}(t+dt) = A + B \cdot dt + C \cdot dt^2 \qquad (3)$$

At step 270, this model is then incorporated into the initial pseudo-range model that is produced in step 265 to form the adjusted pseudo-range model. The adjusted pseudo-range model takes the form:

$$\text{pseudo\_range}_i(d+dt) = (A \cdot c + a_i) + (B \cdot c + b_i) \cdot dt + (C\ c + c_i) \cdot dt^2 \qquad (4)$$

where c is the speed of light.

To determine the additional coefficients A, B, C the GPS processing takes advantage of the fact that in most wireless systems, the wireless transmission themselves are synchronized to some degree with the GPS system. For example, modern paging systems use a time domain multiplexed protocol wherein transmissions from individual transmitters in the system are all time synchronized with GPS.

The synchronism of the wireless system can take on several forms. In some systems, for example older analog cellular phones, only the frequencies of transmissions may be controlled, and while the timing of transmission is arbitrary. In other systems, such as pagers, the frequencies of transmissions may be somewhat arbitrary, but the timing of transmissions is closely controlled to support time domain multiplexing of the channel. Finally, in emerging wireless standards, such as those using code domain multiple access, both frequency and timing of transmissions are closely controlled. For the purpose of the following description, it is assumed that the wireless system has both frequency and timing synchronization with the GPS system.

Figure 3:
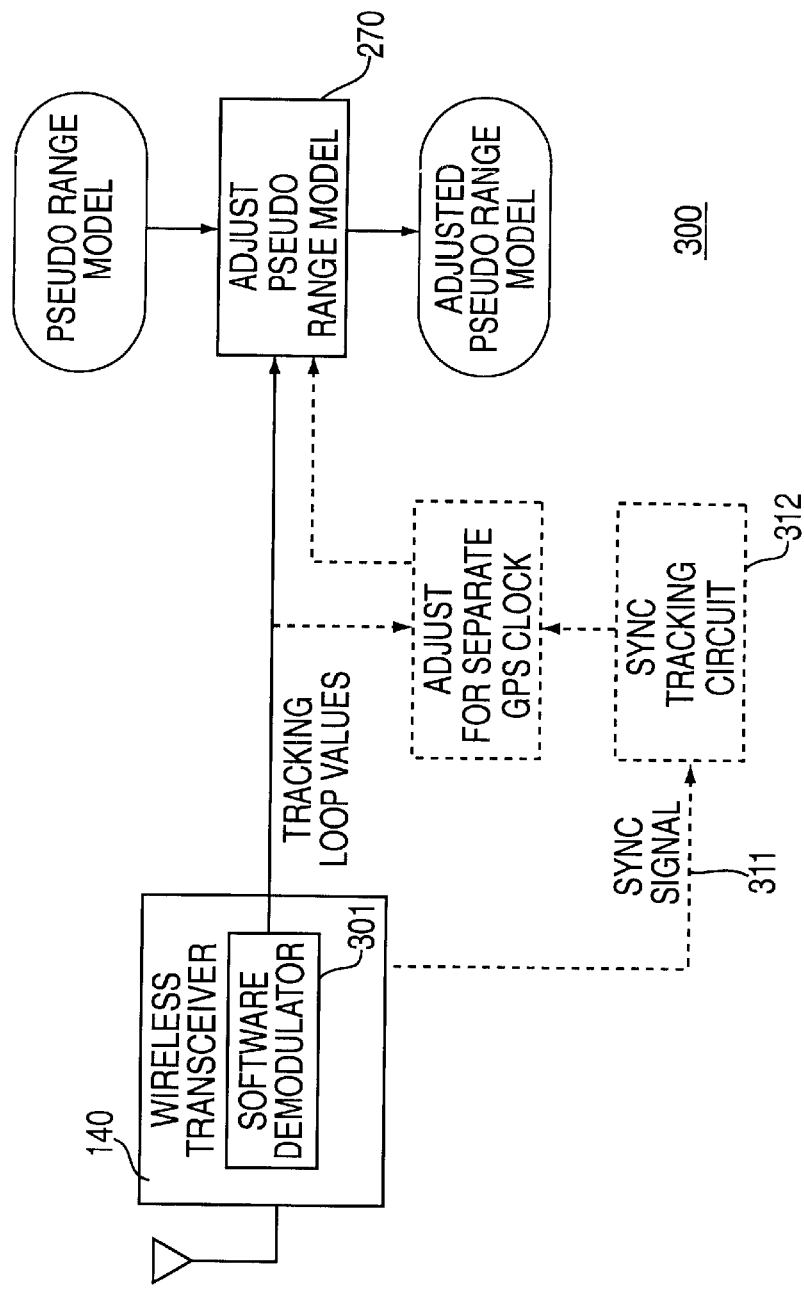
FIG. 3 depicts a functional block diagram for using the wireless system to adjusted for clock errors in a mobile device.

FIG. 3. illustrates a method for using the wireless system 300 to create the adjusted pseudo-range models. A wireless transceiver contains a software demodulator 301, generally implemented in a high speed digital signal processor (DSP). The software demodulator 301, among other tasks, is responsible for tracking the wireless carrier and determining clock and frame timing of data modulation on the wireless carrier. When locked, certain values within the tracking loops of the demodulator will be representative of the offset of the mobile device time and frequency reference from that of the wireless carrier and the data modulation. Since the latter are approximately synchronized with GPS, it may be seen that the values within the tracking loops are representative of the offsets between the time and frequency reference in the mobile device from the GPS system.

In particular, in reference to the equation (3) above, the value A is derived from value of time offset between a reference clock in the mobile device and a frame synchronization point in the wireless carrier modulation. The term B above is derived from the frequency term from the carrier tracking loop in the software demodulator. The term C above is a clock acceleration term that may also be derived from a second order filter term within the carrier tracking loop. At step 270, appropriately derived values for A, B, and C are applied to the pseudo-range model from step 265 to create the adjusted pseudo-range model.

In some systems, the mobile device may contain a feedback loop that keeps the frequency reference for the wireless receiver in the approximate range of the carrier signal. This is no way detracts from the method described since at any moment in time the tracking values in the software demodulator are representative of the instantaneous offset between the frequency reference for the mobile device and the wireless carrier.

Furthermore, in some systems it may be desirable to use separate oscillators or time references to control the processing in the wireless receiver and the GPS. In this case, a sync signal 311 may be optionally provided from the wireless receiver to the GPS processing. The GPS processing samples and tracks the sync signal to determine, on a real time basis, the offset between the separate oscillators and/or time references using a sync tracking circuit 312. These offsets, when combined with the tracking values from the wireless receiver, represent the total offset of the GPS time and frequency reference from the wireless carrier. The sync tracking circuit 312, for example, could consist of a numerically controlled oscillator (NCO) in the GPS that is driven by a feedback loop to generate a pulse in synchronism with the sync signal 311. In this case, the phase value in the NCO at some internal time epoch within the GPS, would be representative of the delay between that epoch and the sync signal 311. Furthermore, the frequency value in the NCO would be representative of the relative rate between clock signals in the GPS and the clock signal in the wireless device used to generate the sync signal 311. In step 313, these values are appropriately scaled and added to the tracking values from the software demodulator 301 to adjust for the separate GPS clock. In step 270, these modified values are used instead of the unmodified outputs from the software demodulator to form the adjusted pseudo-range model.

The above discussion assumed that the wireless carrier is synchronized in time and frequency to the GPS constellation. In the case where the wireless carrier has only frequency synchronization, it is not possible to compute the A term in equation (3). In this case, the adjusted pseudo-range model can still be created but will be initially uncorrected for an arbitrary bias in the clock term $(A \cdot c + a_i)$. The model is nevertheless useful because it contains information about pseudo-range rates. Furthermore, since the unknown term A is identical for all satellites, the GPS processing can subsequently solve for the term A once the pseudo-range delay to a single satellite is determined.

It should be noted that the PALS method does not require or assume that the techniques described above provide perfect time and frequency synchronization with the GPS system. In practice, there are many sources of possible error in the coefficients A,B,C including errors in the timing and frequency of the wireless transmissions, tracking errors in the software demodulator, and unknown delays and frequency deviations caused by the motion of the mobile device. As will be discussed below, the adjusted pseudo-range models are used to predict only nominal values of pseudo-range and pseudo-range rate to which uncertainty bands are added to ensure that the range of signal search is adequate.

Returning to FIG. 2, the adjusted pseudo-range models generated at step 270 assist in the signal search function of step 290 that is performed by the GPS signal processing in the mobile receiver 130. Specifically, the adjusted pseudo-range model produces bounds on the uncertainties associated with the expected frequency and time of arrival of the satellite signals. This enables the signal search function to accurately guide the detection and measurement process that is performed at step 291. It should be noted that steps 291 and 290 are interactive in that the results of detection and measurement can further guide the signal search step (as represented by path 285). Details of the signal search method employed in the preferred embodiment are described below with respect to FIG. 4.

It is understood that the pseudo-range model is just one embodiment of the invention's use of the initialization packet for accelerated signal detection and measurement. Two other embodiments, stored almanac model & compact orbit model, are described later.

Figure 4:
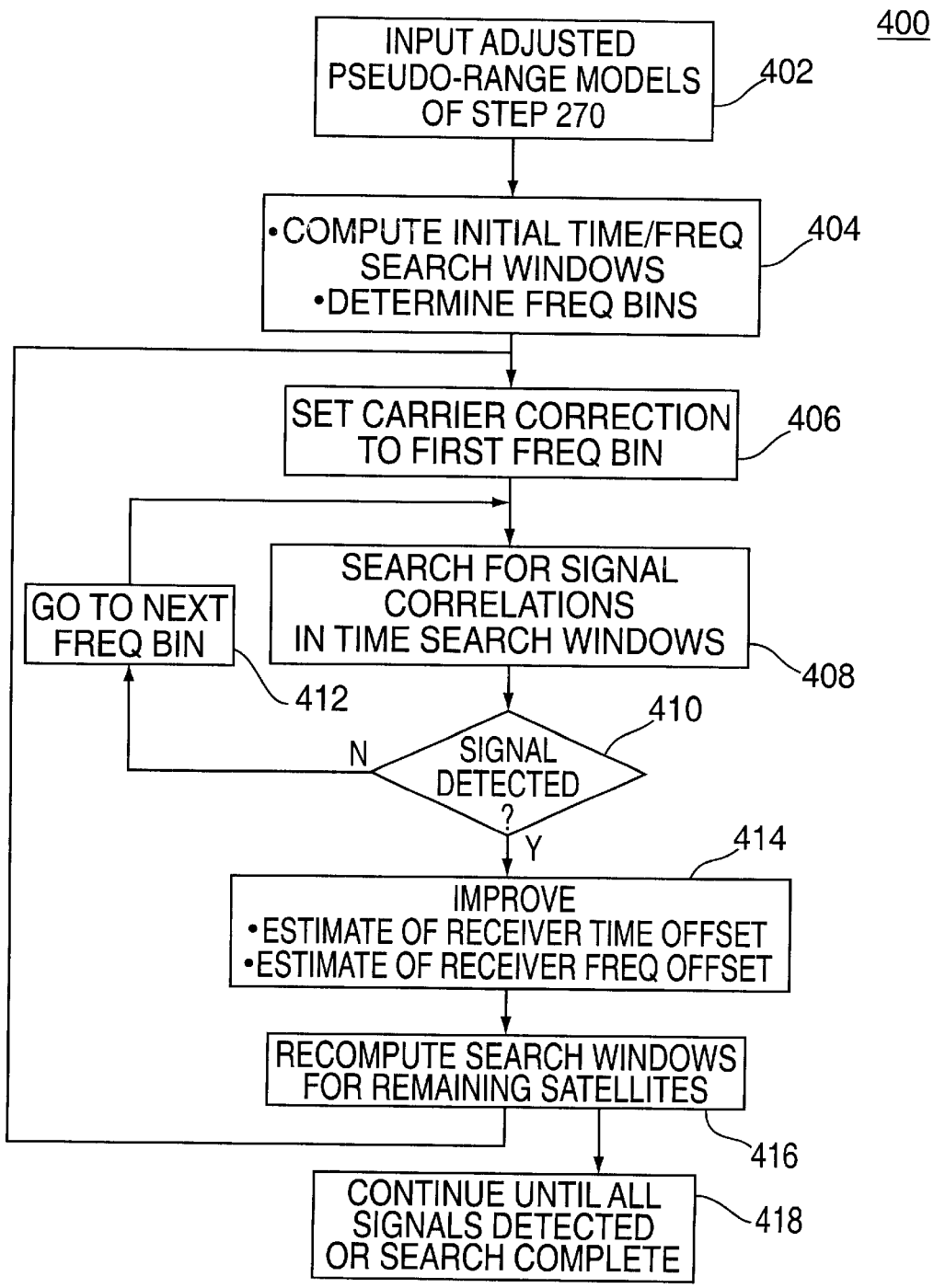
FIG. 4 depicts a flow diagram of a signal search method.

FIG. 4 is a flow diagram of a method 400 of signal search (step 290). The method begins at step 402 with an input of adjusted pseudo range model of step 270. At step 404, the model is applied at the current time in the mobile device and is used to estimate the current frequency and timing of GPS satellite signals, as well as the expected uncertainties of these quantities, to form a frequency and delay search window for each satellite. This window is centered on the best estimates of frequency and delay but allows for actual variations from the best estimates due to errors in the modeling process including inaccuracies in the rough user position, errors in the time and frequency transfer from the wireless carrier etc. In addition, the frequency uncertainty is divided into a number of frequency search bins to cover the frequency search window.

In step 406, the detection and measurement process of step 291 in FIG. 2 is then set to program the carrier correction to the first search frequency. At step 408, the parallel correlator is invoked to search for signal correlations within the delay range of the delay window. At step 410, the method 400 queries whether a signal is detected. If no signal is detected, the carrier correction is set, at step 412, to the next search frequency and the search continues until a signal is found or the frequency search bins are exhausted.

If, at step 410, the method 400 affirmatively answers the query, the signal is used at step 414 to further improve the estimate of clock time delay and clock frequency offset. This information is utilized at step 416 to re-compute the frequency and delay search windows for the remaining undetected satellites. In step 418, the process continues until all satellites have been detected or the search windows have been exhausted.

The method of FIG. 4 is illustrative of one of a variety of algorithms that can be used to guide the search process based on the GPS signal processing's ability to estimate time and frequency. Additionally, the algorithms could be altered to include various retry mechanisms since the signals themselves may be fading or blocked.

Convert PN Code Phases to Full Pseudo-range

The output of the detection and measurement process (step 291) is a set of sub-millisecond PN code phase values 292 for as many satellites as could be detected by the GPS baseband processor. This information is sent to the position server 120 through links 109 and 111.

Figure 5:
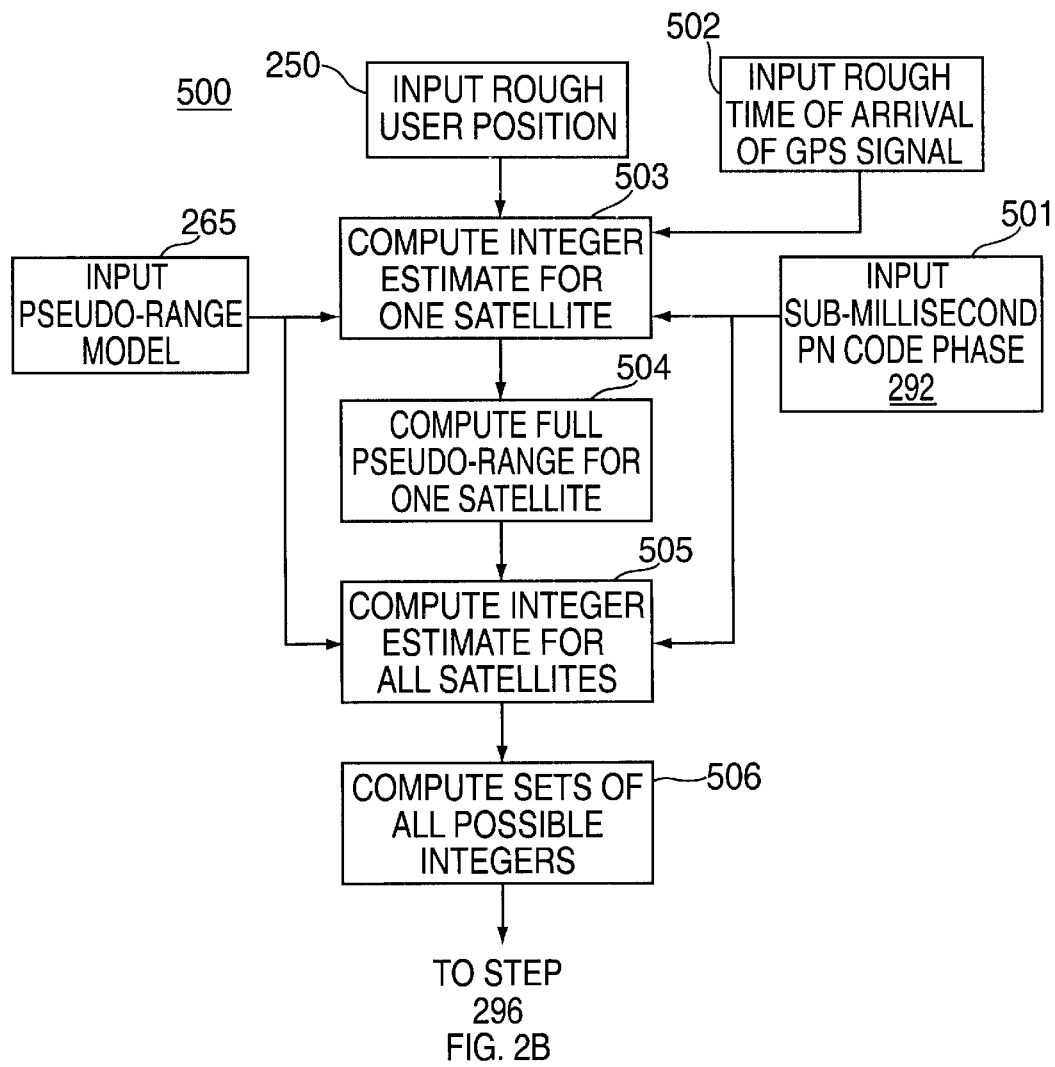
FIG. 5 depicts a flow diagram of a method of producing the correct integer values of milliseconds in the pseudo-ranges.

In order to convert the values to full pseudo-ranges at step 295, it is necessary to ascertain the number of complete PN cycles (integer number) that must be added to the PN code phase value 292 to reach a full pseudo-range. FIG. 5 depicts a flow diagram of a method 500 for ascertaining the complete PN cycles.

In the method, only the relative integer values, not the actual values, are required, that is, if all the integer values are adjusted by the same amount, the subsequent position and time solution produced at step 296 will be the same. This is because the position and time solution will remove any common-mode error. It is noted that all pseudo-ranges are expressed in milliseconds to represent the time of flight of the GPS signal from the satellite to the mobile device.

The method 500 begins with the rough estimate of user position from step 250 and rough estimate of the time of arrival of the GPS signal at the mobile device (step 502), obtained from the real time clock at the position server. In one embodiment, a reference satellite is chosen as the satellite with the highest elevation angle of all the available satellites. The PN integer number for this satellite is estimated by rounding the difference between the pseudo-range model (expressed in milliseconds) and the measured sub-millisecond PN code phase (expressed in milliseconds):

$$N_1 = \text{round}(\text{pseudo\_range}_1 - \text{PN\_code\_phase}_1) \quad (5)$$

The full pseudo-range is computed at step 504 for the reference satellite is then computed by adding the computed integer to the sub-millisecond PN code phase at step 501. At step 505, the method 500 computes the PN integer numbers for the other satellites by rounding the difference of the full pseudo-range of the reference satellite with the sub-millisecond PN code phase of each of the other satellites.

$$N_i = \text{round}(\text{pseudo\_range}_1 - \text{PN\_code\_phase}_i) \quad (6)$$

Note that this equation (6) differs in a subtle but important way from equation (5), in that the pseudo-range used is for satellite 1, while other terms are for the satellite i, resulting in a total cancellation of all common mode errors in the measurements (most of these come from the mobile device clock error).

It is understood that other techniques may be used to estimate the integers, some of which may not difference between satellites as done above.

Because the satellite range (expressed in milliseconds) changes by less than 0.17 milliseconds per minute, the above technique will typically yield the correct integers whenever the rough time estimate is within two or three minutes of the correct GPS time of measurement. Also, because one millisecond of range corresponds to approximately 300 km in distance, this technique typically yields the correct integers when the rough user estimate is within approximately 100 km of the true position of the mobile device. When operating over a wide area such that the estimate of user position has a larger error, or the latency is several minutes, there will be multiple sets of possible integers. To ensure that the correct integers are selected, the method 500, at step 506, computes all sets of possible integers. For each set, the server performs a position computation. If the solution is over-determined, a set of residual values is obtained, indicating the degree of fit achieved in the least squares algorithm. Incorrect integers will yield very large residuals, and they can be eliminated, leaving only the correct combination of possible integers and the correct position and time.

Returning to FIG. 2, the ability of the residual detection method to identify the correct set of integers is further enhanced by using range measurements from other sources, such as altitude estimates from a terrain model, time of arrival measurements from wireless communications links, angle of arrival measurements at cell towers, and the like. Each of these class of measurements may be also included in the position computation 296 as described in FIG. 9.

Compute Position

Figure 9:
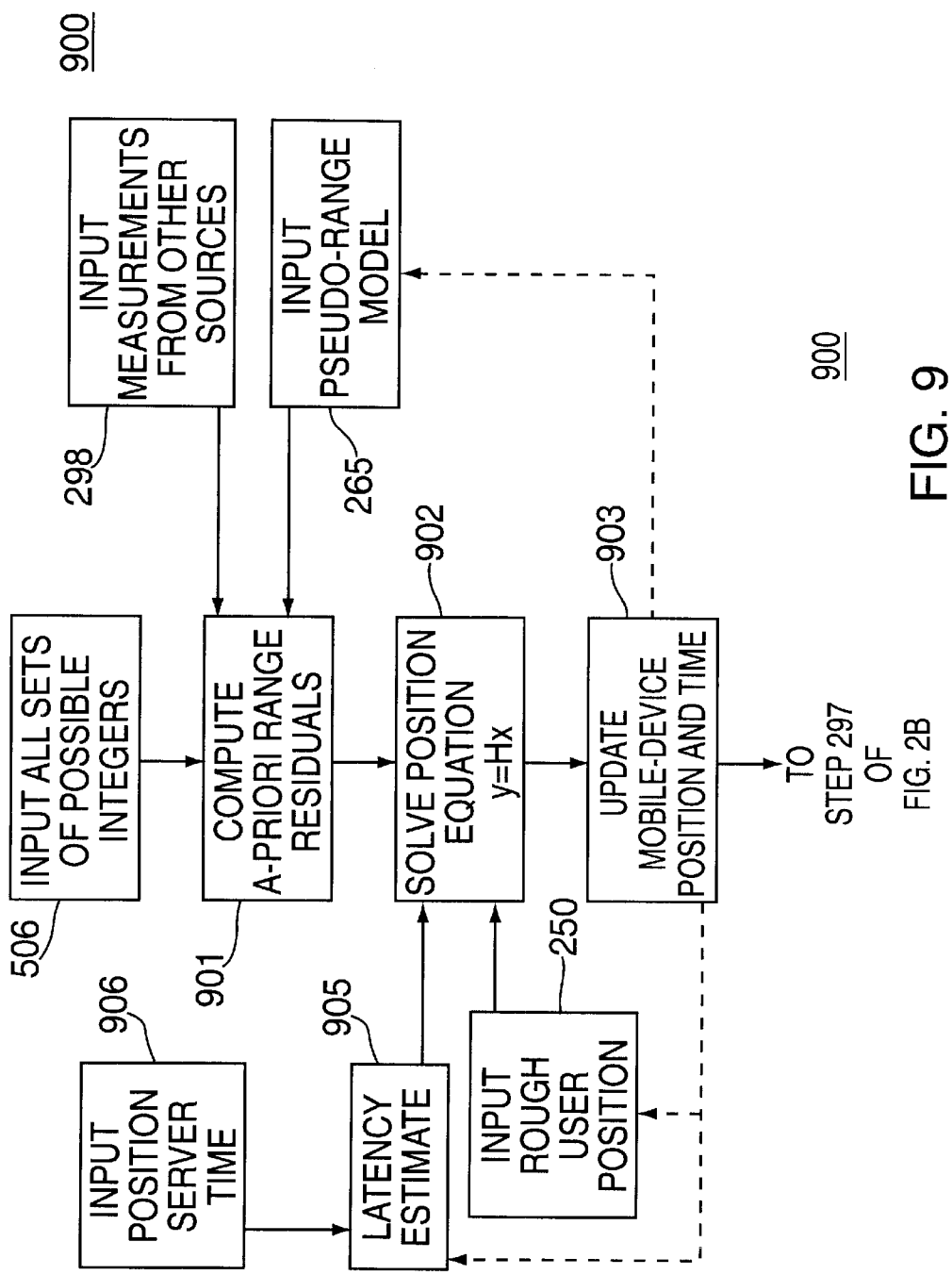
FIG. 9 depicts a flow diagram of a method for calculating position and time from measured data.
Figure 10:
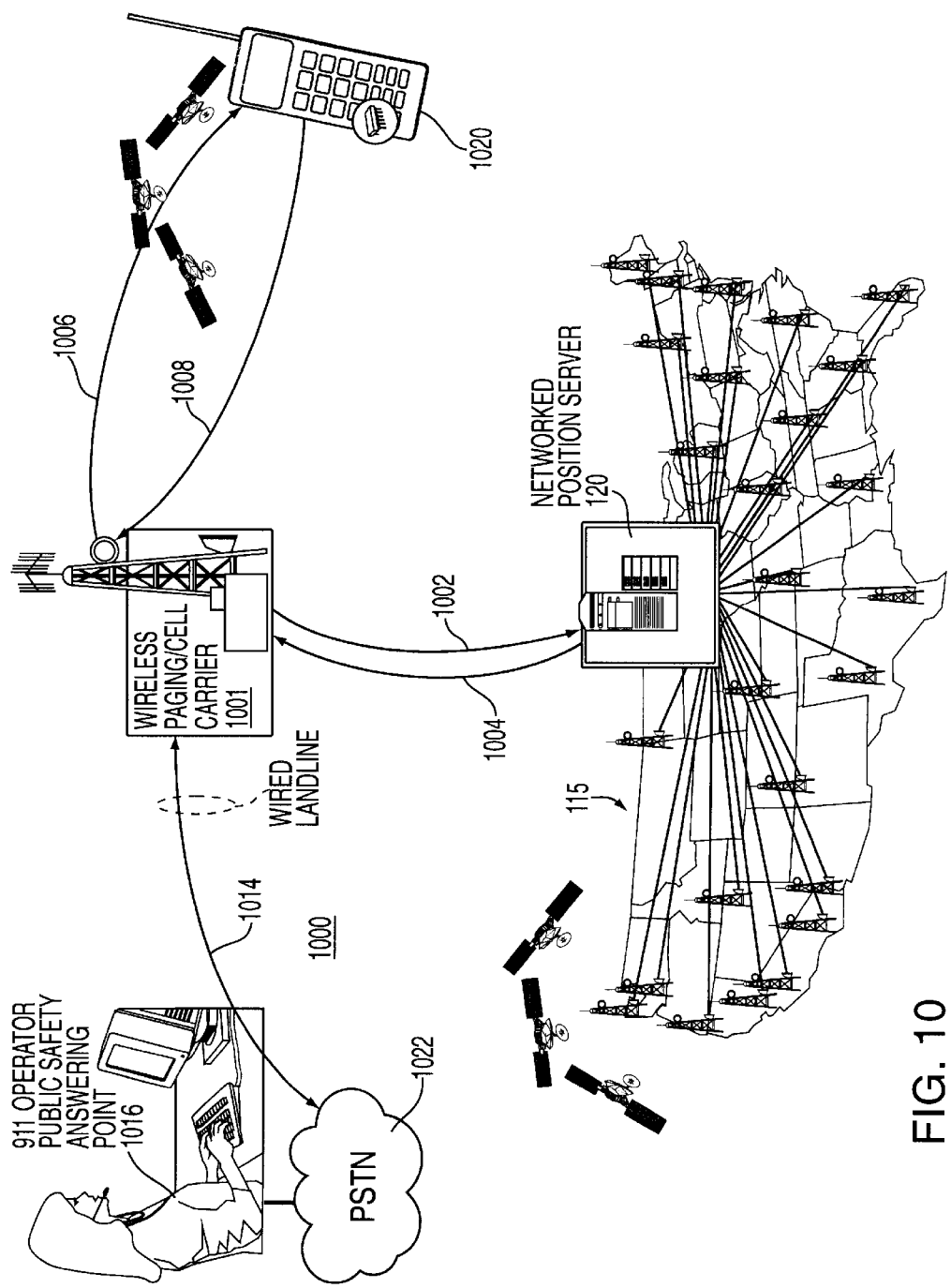
FIG. 10 depicts a functional block diagram of a system for transferring location data in an emergency 911/cellular phone environment.

FIG. 9 depicts a flow diagram of a method 900 for computing the mobile device position and time of GPS measurement. The method requires no knowledge of time of measurement from the mobile device, in that only sub-millisecond PN code phase information is supplied from the mobile device, and all other information is obtained from the network of GPS reference stations 110, or computed at the server as described below.

All sets of possible integers are computed in step 506 of FIG. 5. For each of the possible integer combinations, the a-priori range residuals are calculated by differencing the measured pseudo-ranges from the pseudo-range model from step 265 of FIG. 2A. The pseudo-range model relies on the calculation of satellite positions at the time estimated by the server. The error in this estimate is unknown, because the latency of the communication link is unknown, but it can be accurately calculated in step 902, after using an initial latency estimate of zero seconds, and iteratively updating this estimate with the result of step 902. The model of latency error is incorporated in the position equation. One embodiment of the position equation is:

$$y = Hx \quad (7)$$

where:

y is the vector of a-priori range residuals 901. x is the vector of: updates to user position, the common mode errors, and the latency error. The updates to user position are commonly, but not necessarily, expressed in the coordinates: East, North, Up.

H is a matrix with five columns. The first three columns are line-of-sight vectors, of unit length, pointing from the satellites to the rough user position. The fourth column is all ones, this is the model of the effect of the common mode errors on the measurements. The fifth column contains the negative of the range rate, which is the model of the effect of latency on the measurements.

Note that the first four columns of H and the first four elements of the vector x are standard in the GPS literature. The innovation in this method is the inclusion of an exact model of the latency error. Note further that the latency error is not a common mode error, like the mobile device clock error (which is present in all the sub-millisecond PN code phases). The latency error affects each of the ranges in a different way, since each of the satellites has a different range rate. However, because this method exactly models the effect of latency in the position equation the error is completely removed in the solution of the equation. Thus, there is no need to get any information from the mobile device other than the sub-millisecond PN code phases. In particular, no time tag is required.

Because the above equation solves for the latency error, at the same time as solving for the mobile device position, the method can be used in systems with large and unknown latency in the communication link.

There are many standard ways to solve the position equation, described in standard linear algebra texts. One embodiment is:

$$x = (H^T H)^{-1} H^T y \quad (8)$$

Once the position equation has been solved, the user position, and server time can be updated at step 903. The pseudo-range model is then recalculated with a more accurate estimate of the satellite positions and the mobile device position and time of measurement (with latency corrected). This iteration is repeated until the solution converges.

Returning to FIG. 2, it should be noted that the method 200 has the property that it implicitly corrects the errors typical in GPS, and does so in a way that is significantly different from conventional GPS techniques.

Conventionally GPS errors are corrected by a technique known as Differential GPS (DGPS), in which a GPS reference station is located in the vicinity of the mobile device. GPS errors measured at the mobile device will also be measured at the reference station. The reference station, being located at a known point, can calculate the effect of the GPS errors, and provide a means for correcting these errors in the mobile device, or in the data transmitted from the mobile device. The reference station does not need to, and typically does not, calculate the component parts of the GPS errors. The technique relies on the fact that the cumulative effect of the GPS errors is similar at the reference station and at the mobile device. Implicit in this is the requirement that the reference station be close to the mobile device.

The data from the mobile device may be transmitted to the reference station and processed there. In this case the technique is known as Inverse DGPS. The same constraint, that the reference station be close to the mobile device, applies.

The current invention provides for a Wide Area Inverse Differential GPS technique, with the significant innovation that the corrections to the standard GPS errors are implicit in the method of calculating position, and applicable to any mobile device anywhere in the world. This is because, in the method 200, the position computation being performed at the server, uses a wide area model 220 that is already precise, that is, the GPS errors that would usually afflict a standard GPS system have already been removed. Thus the computed position is not subject to the standard GPS errors, no matter where the mobile device is located.

In step 298, extra measurements, from external sources or models, can be included in the position equation as follows. For each extra measurement an equation is formed relating the measurement to the states in the vector x. One embodiment of an extra measurement, that is always available, is the use of a terrain model to estimate the height of the mobile device. A terrain model may be stored in a database accessible by the server. Using the estimated position of the mobile device, the model is used to derive a measure of the device's altitude. This is then added as an extra row to the position equation (7):

$$y_{altitude} = H_{altitude} \cdot x \qquad (9)$$

where:

$y_{altitude}$ is the measurement residual associated with the rough user position, and the altitude model, $y_{altitude}$ = altitude_model – rough_user_altitude $H_{altitude}$ is the row added to the H matrix to describe the relationship between x and $y_{altitude}$, $H_{altitude} = [0,0,1,0,0]$ x is as described above in equation (7), with the updates to the rough user position expressed in coordinates East, North, Up.

Another embodiment of extra measurements is the use of time-of-arrival measurements that may be available from the communications-link used to send data to or from the mobile device. These measurements give a measure of the distance of the mobile device to a fixed point. These measurements can be included in the position equation (7) in a similar way to the satellite pseudo-range measurements. An extra row is added to the position equation for each extra measurement, and the elements of the matrix H are used to model the relationship between the states, x, and the measurement residuals, y.

Another embodiment of extra measurements is the use of angle-of-arrival information available from wireless systems with directional antennas. These measurements can be added into the position equation in a similar way to that described above.

Another embodiment of extra measurements is from other satellite systems from which range measurements may be available. These measurements are included in a similar way to the GPS measurements described above.

It is understood that other standard mathematical techniques may be used to include extra measurement information, for example, the technique described above for including altitude as an extra line in the position equation (7) may equivalently be done by removing one of the unknown states in the same position equation.

One reason for using extra measurement information is that the position equation (7) typically requires at least as many measurements as unknown states in order to solve the equation for the unknown states. The more measurements that are available, the better the system will work. In particular, a system that uses measurements from sources other than GPS will be able to calculate a position in low signal strength environments, such as indoors, where it may be difficult or impossible to make measurements from multiple GPS satellites.

Another reason for using extra measurement information is that it enhances the fault detection methods described below.

Fault Detection

Once a position has been computed at step 296, a process known as fault detection is used at step 297 to determine whether there are significant errors in the data used to obtain the position. There are many fault detection techniques, described in the GPS literature, that are applicable to the current invention.

One example of a fault detection technique is the use of an over determined position equation (7) to form post-fit residuals. An over-determined equation is one with more measurements than unknown states. The post-fit residuals are the differences between the actual measurements and the measurements that are expected given the calculated states (in the example above the states are: updated position of the mobile device, common mode errors and the latency). For an over-determined solution the magnitude of the residuals will be of the same order as the magnitude of errors in the measurements. Thus, by examining the magnitude of the residuals, the system can tell if there were any significant measurement errors. This technique is especially useful in the context of the invention, where errors may be introduced due to the incorrect integers being used in the pseudo-ranges. If the correct integers are used, the post-fit residuals will be of the order of several meters, while if the incorrect integers are used then the post-fit residuals will be of the same order as the incorrect pseudo-ranges, which is hundreds of kilometers, because each integer number of milliseconds corresponds to almost 300 km of pseudo-range error. Thus the method can readily determine which position solution corresponds to the correct integers. This, in part, explains why the invention provides a wide area solution, where the approximate mobile device position may be very poorly known, and the time of measurement of the signals may not be known at all. As described earlier, all possible integers can be considered, and the server can eliminate incorrect errors through the fault detection technique. Because this fault detection technique relies on an over-determined solution, the performance of this method is enhanced by the addition of extra measurements from sources other than GPS.

Another example of an applicable fault detection technique is to check the position and/or time solution against known constraints on the position and/or time. For example, if the altitude of the mobile device is known, then a reasonableness check can be done on any computed position to see if the computed altitude agrees, within some bounds, with the known altitude. Similarly any other known constraint on position and/or time may be used as a reasonableness check.

This technique can be used in addition to the post-fit residual technique described above.

The fault detection techniques are also employed to guard against faulty position results caused by incorrect measurements from the GPS processing in the mobile device. The fault detection, for example, can detect an erroneous reading caused by the misidentification of a correlation peak, or by the receipt of a signal with large multipath delay. The result, at step 299, is an accurate position for the mobile device.

Stored Almanac Model

In FIG. 2A, an alternative method is shown to the pseudo-range model described above. At step 280, this method uses a stored almanac model to provide initialization information to accelerate signal detection in the mobile device. This alternate embodiment stores a GPS satellite almanac in the GPS processing in the mobile device. The GPS satellite almanac is a compact model of the satellite orbits and clocks, broadcast by the GPS satellites, and intended primarily for use in selecting satellites in view. In this embodiment the position server sends the rough user position at step 250 and a server time estimate to the GPS processing in the mobile device. The latter uses the almanac models, together with time and position, to generate pseudo-range models using processing algorithms similar to those described in steps 260 and 265. The result of this processing is a pseudo-range model that will differ slightly from that created in steps 260 and 265 by the position server, the differences arising from the deviation between the almanac model of orbit and clocks and the precise models of orbits and clocks available from step 221 and 222.

The position server concurrently maintains a copy of the almanac that exists in the mobile GPS processing. The position server computes a pseudo-range model based on this almanac (mirroring the computation in the mobile device) and compares the result to the precise pseudo-range model of step 265. Information representing the differences between the models is then transmitted to the mobile device, allowing the mobile GPS processing to improve upon the pseudo-range model that was initially computed from the stored almanac.

For example, in one embodiment, the correction terms sent by the server consist of delta pseudo-range rates that allow the mobile device to improve upon the pseudo-range rate term in its model. Often it will be important to correct this term since pseudo-range rate information is used to guide the parallel GPS correlator (see below).

Furthermore it is understood that the adjustments shown in FIG. 3 and its description above are necessary for this alternate embodiment in order to adjust the information calculated from the almanac for the effect of the mobile receiver clock.

Compact Orbit Model

In FIG. 2A by using step 290, an alternative method to the pseudo-range model described above is formed. This method produces a compact orbit model. The embodiment is useful when it is desired to provide a set of compact composite orbit models to the GPS processor 138 in the mobile device 130 rather than providing the pseudo-range model. Two reasons for providing a compact composite orbit model are: First, a single compact composite orbit model could be broadcast for use by any number of mobile devices in a large region. Second, the availability of the compact composite model enables the mobile device to calculate its own position on an autonomous basis without further interaction from the server.

The method for computing the model involves taking the wide area model 220, which is valid worldwide and over a large period of time, and reducing it to a more compact model that is valid over a specific geographic area for a specific time window. The reason for doing this, instead of simply broadcasting the model 220, is that the compact model can be packed into a smaller data structure.

One embodiment of the alternative method is to compute satellite positions (using model 220) at several times $t_1$ through $t_n$. A polynomial curve fit is then done. The parameters of this curve fit then make up a compact orbit model.

Another embodiment is to absorb the clock errors and troposphere/ionosphere errors into the orbit model by computing an equivalent orbit that will yield the same pseudo-range as the original orbit model adjusted by clock, ionosphere and troposphere corrections.

It is understood that there are other similar mathematical techniques to create similar or identical compact models that are valid over some region, and over some time window.

Furthermore it is understood that the adjustments shown in FIG. 3 and its description above are necessary for this alternate embodiment in order to adjust the information calculated from the compact model for the effect of the mobile receiver clock.

Software Embodiment of the Parallel GPS Correlator

Figure 6:
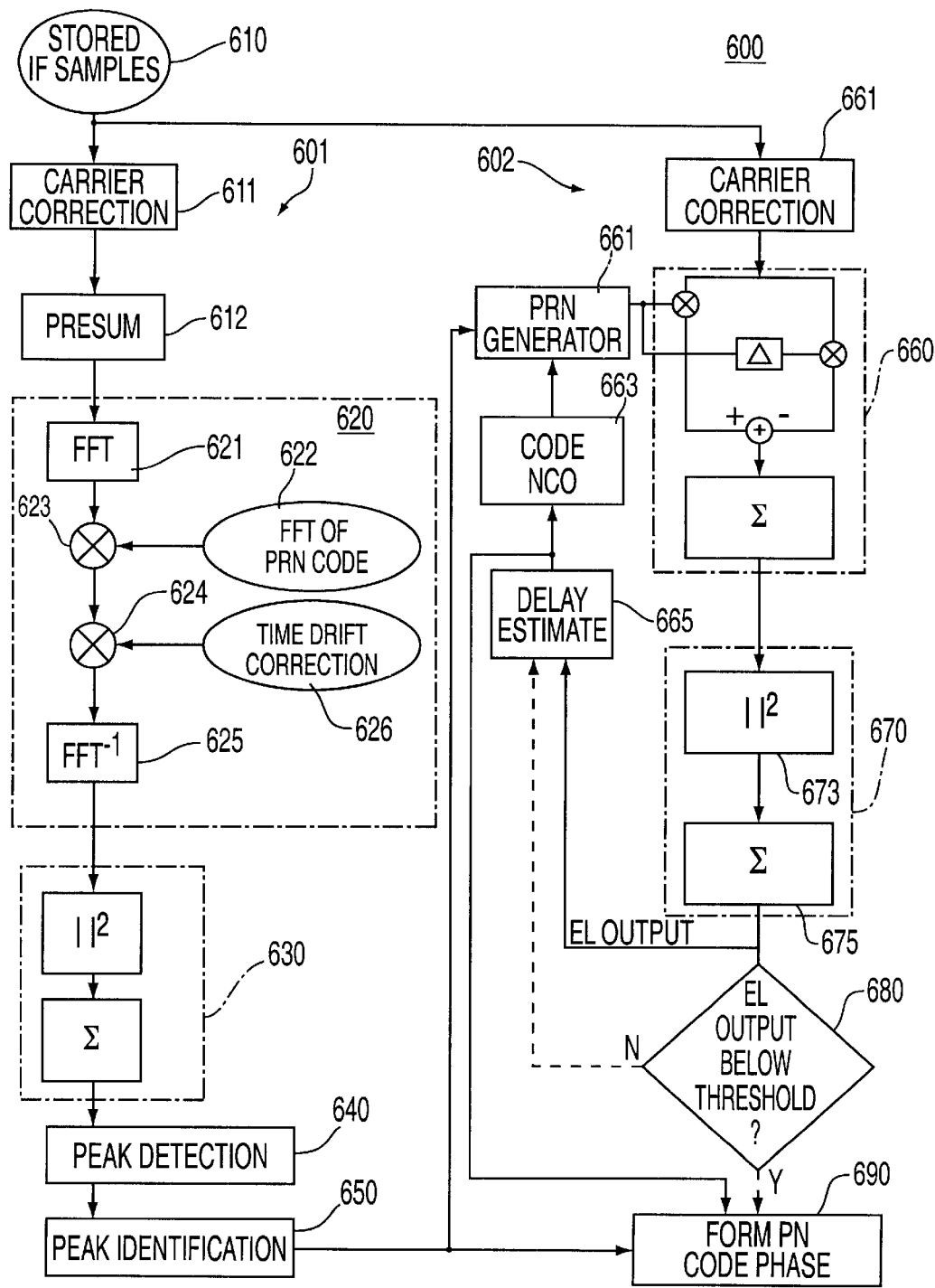
FIG. 6 depicts a flow diagram of a software implementation of a parallel GPS correlator.

FIG. 6 is a flow diagram of a method 600 for performing the GPS signal processing in the mobile device. This embodiment uses a digital signal processor (DSP) operating on stored input. In one embodiment of the invention, the method is implemented as a software routine as described below. To capture the necessary GPS signal, input samples are received by the mobile device via a conventional GPS front end which translates the input signals to an IF frequency. Digital samples are taken using either a multi-bit ADC or a 1 bit binary comparator. At step 610, the captured samples are then stored in memory within the mobile device for subsequent processing. Typically, several hundred milliseconds of data are stored.

The method 600 consists of two major processes; a signal detection process 601 and a signal measurement process 602. The signal detection process 601 determines the presence or absence of a GPS signal and the approximate PN code delay for the signal. Then, in the signal measurement process 602, the precise value of the PN code phase is determined.

The signal detection process 601 consists of several steps as outlined below. At step 611, the first phase involves applying a carrier frequency correction term as provided by the signal search step 406 or 412. To apply the correction, the input samples are multiplied by a complex exponential term equal to the complex conjugate of the carrier frequency correction. By adjusting the correction term, the nominal IF tuning offset inherent in the RF front end design can also be removed during this step. The output of step 611 yields a complex result, i.e. the result is composed of an in-phase term (generated by multiplying with the cosine function of the carrier frequency) and a quadrature term (generated by multiplying with a sine function of the carrier frequency). For simplicity, these complex quantities are not explicitly illustrated in FIG. 6.

At step 612, the input samples are pre-summed prior to processing to improve SNR and to reduce the processing burden. The pre-sum operation takes advantage of the fact that GPS signals consist of at least twenty identical epochs (each epoch consisting of a full cycle of the PN code and twenty epochs being the data bit period). Samples taken at the same relative position within small groups of succeeding epochs can be summed to yield a single set of samples representative of all epochs. In one embodiment, the pre-summing operation is performed over groups of nine epochs, a value which ensures that data bit transitions on the GPS carrier will usually not affect the pre-summed quantities. By contrast, pre-summing over longer periods would tend towards zero due to the data bit transitions.

A convolution operation (multi-step process 620) is then performed to identify points of correlation between the input signal and the known satellite signal. While this convolution can be performed by a variety of techniques, an FFT based approach, commonly known as a fast convolution, is computationally efficient.

More specifically, the fast convolution process 620 begins by performing an FFT at step 621 on the block of input samples. At step 623, the result is multiplied by the FFT of the PN code waveform 622. Then, at step 624, the method 600 multiplies the product by a time drift correction 626. At step 625 an inverse FFT of the result is computed to obtain the desired convolution. To save computational load, the FFT of the PN code for all satellites is pre-computed and stored in memory.

To improve SNR, the results of many fast convolutions are summed in a non coherent integration step 630 by summing the magnitude square of the individual convolutions. The result is an improved SNR magnitude squared estimate of the convolution. The non coherent integration step 630 requires that the individual convolutions be time aligned to account for the drift of the PN code between the pre-summed groups. The expected time drift between each pre-sum group may be computed because the expected code frequency is known for the search (the code frequency will always be 1/1540 of the carrier frequency). The time drift is conveniently compensated for during the convolution operation by applying a time drift correction 626 during step 624. In step 624, the transform domain representation of the convolution is multiplied by a complex exponential with a linear phase characteristic, which, it may be understood, has the effect of shifting the convolution output in time. As each group is processed, the slope of the linear phase term in step 626 is increased to compensate for the expected time shift of the PN code relative to the first group. Thus in this manner, all the convolution outputs will be approximately aligned in time and may be summed.

Figure 7:
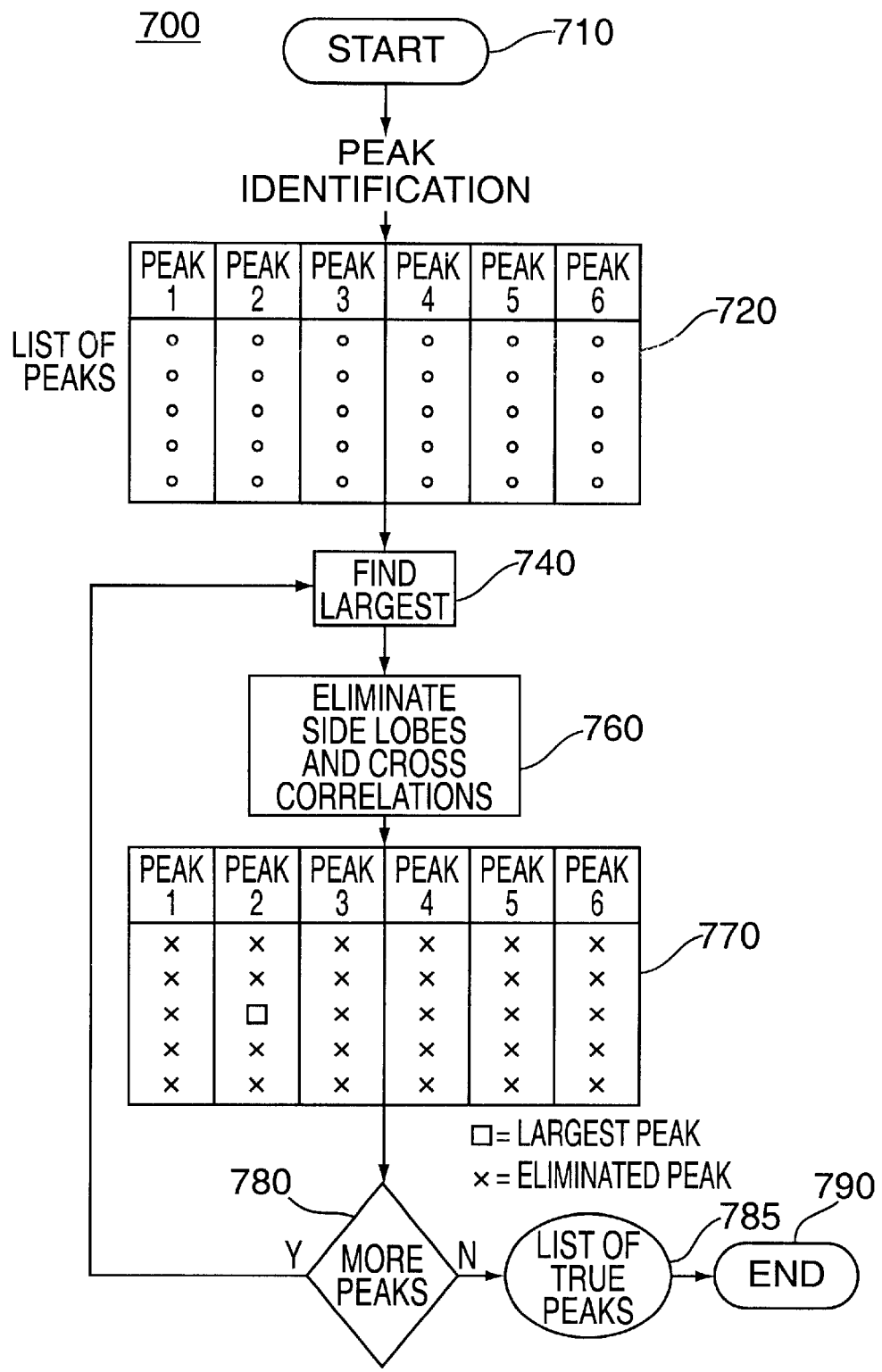
FIG. 7 depicts a flow diagram of a method of identifying true correlation peaks.

The non coherent integration is followed by step 640, wherein a peak detection is performed in which the results of the non coherent integration are scanned for correlation peaks. The resulting list of peaks are further analyzed during peak identification at step 650. The list is stripped of false peaks that may result from correlation sidelobes. FIG. 7 and the following description provide a detailed flow diagram for the peak identification process of step 650, the result of which is an identified peak location for the each satellite.

It should be noted that the fast convolution and peak identification technique of the software method 600 is intended only to identify the approximate delay value for the satellite, e.g. the approximate peak location. To obtain better accuracy the method proceeds to the signal measurement process. This process makes a precise measurement of the delay value for the satellite, e.g. the exact peak location is determined.

The signal measurement process 602 begins with the original stored IF samples, then, at step 661, proceeds with a carrier correction step that is methodically identical to 611. The output of the carrier correction step is coupled to an early-late (E-L) correlator 660. The carrier corrected IF samples are multiplied by both early and late versions of the PN reference code generated by the PN generator of step 661. The early and late products are differenced to form an early minus late signal that is accumulated for samples spanning several epochs. The complex magnitude squared value of the accumulator output is formed at step 673, and these values are further accumulated over a longer time span in the non coherent accumulator at step 675. The result is a well averaged value of the E-L correlation.

The accumulations leading to the E-L output consist of both coherent summation and non coherent (magnitude square) summation. In one embodiment, the coherent summation interval is chosen as nine epochs. This value is short enough to ensures that data bit transitions due to the GPS navigation message will not cause significant loss when averaged (see discussion above). Furthermore, limiting the coherent averaging time relaxes the requirement that the carrier correction process be highly accurate.

The PN generator of step 661 produces the reference code used in the early-late correlator 660. Initially, the code offset, e.g. the starting position of the code relative to the stored input samples, is set to the value resulting from peak identification process of step 650. At step 663, the rate of code generation is set by the code numerically controlled oscillator (code NCO) to the expected code rate as determined from the adjusted pseudo-range model of step 270 in FIG. 2.

The averaged value of the E-L correlation is used to update the phase of the NCO, in order to achieve better alignment the PN code generator to the input signal. When the best alignment is achieved, the E-L correlator output value will be minimized. This phase updating of the NCO continues in an iterative fashion until the E-L correlator output value reaches an acceptably small level (i.e., the threshold value at step 680). Once reached, the delay estimate produced at step 665 is a considered the final value of the PN code phase that is output at step 690.

A variation of the method eliminates the iterative process described above. In the variation, the values of the early and late correlations are independently examined to estimate the location of the precise correlation peak. This offset is directly taken as the PN code phase measurement without performing additional correlations. This method saves computation, but will be less accurate in the presence of noise.

Another variation of the method 600 is to perform the early-late correlation on the presummed groups of samples as formed in step 612. The advantage of this approach is that it reduces the number of operations required to perform the accumulation since the presumming reduces the size of the data. It should be noted that in this formulation the code NCO operation would have to be modified to periodically jump forward to account for the delay between the presummed blocks.

Also, it should be noted that the early-late correlator is one of many correlation forms that can be used. The approach is very general and can be used to formulate a variety of correlation impulse responses.

For example, a combination of four delayed reference waveforms can be used to form a correlator with the desirable property of limiting response of the correlator to a very small window around the true correlation peak. This technique helps eliminate corruption of the delay estimate by multipath delayed signals. This, and the other techniques used in conventional tracking receivers to reject code multipath are applicable. Moreover, many of these correlation forms also provide estimates of the amount of multipath present. For example, in the presence of multipath, a narrow correlator spacing will yield different results from a standard E-L spacing. These differences can provide an estimate of the multipath in the system. Furthermore, such metrics could be sent to the position server to improve the position solution or provide warnings when accuracy's are degraded.

FIG. 7 depicts a flow diagram of a method 700 for peak identification for locating a mobile device. This method corresponds to the peak identification process of step 650 of FIG. 6. The peak identification method 700 begins by examining the list of candidate peaks resulting from peak detection step 640 in FIG. 6. This list contains the location (delay offset), PN, and magnitude for each peak. The peaks found in each convolution are a result of correlation and correlation sidelobes between the desired satellite signal, as well as cross correlation components from other satellites.

Because of the possible high dynamic range between satellites, it cannot be assumed that the largest peak found in each convolution is a result of correlation against the desired signal. However, the fact that the cross correlation properties of the PN codes are known in advance can be used to eliminate false peaks. One such algorithm for eliminating false peaks is as follows. The method 700 begins at step 710 and proceeds to step 720 where all peaks are searched and the largest peak selected. This largest peak will always correspond to a true correlation peak. In step 740, method 700 determines the largest peak and proceeds to step 760.

In step 760, all the sidelobes and cross correlation peaks associated with the true correlation peak are eliminated from the list of peaks based on the known code sidelobe and cross correlation properties. In step 770, the remaining peaks are searched for the largest remaining peak. Since sidelobes and cross correlations from the first signal have been removed, this peak must also be a true correlation. The sidelobes and cross correlation of this second peak is eliminated, and in step 780, the method 700 continues until all true correlation peaks have been identified. In step 785, a list of all the true peaks is obtained, and, in step 790, the method 700 ends.

Hardware Embodiment of the Parallel GPS Correlator

In alternative embodiment for signal processing, the parallel GPS correlator is implemented via custom digital logic hardware contained in an application specific integrated circuit (ASIC) referred to as the Block Search ASIC. Other components of the ASIC include a microprocessor core, program and data memory, and a dual port memory used by the custom logic and the microprocessor. Unlike the software embodiment of the parallel GPS correlator, the hardware implementation processes incoming IF data samples in real time and therefore does not need a large sample memory as required in step 610 of FIG. 6. Furthermore, the hardware embodiment, unlike the software embodiment, requires minimal computational power in the host CPU. The preferred embodiment, hardware or software, for a particular device will depend strongly on the resources (i.e. memory and CPU) that are available from other functions in the mobile device.

Figure 8:
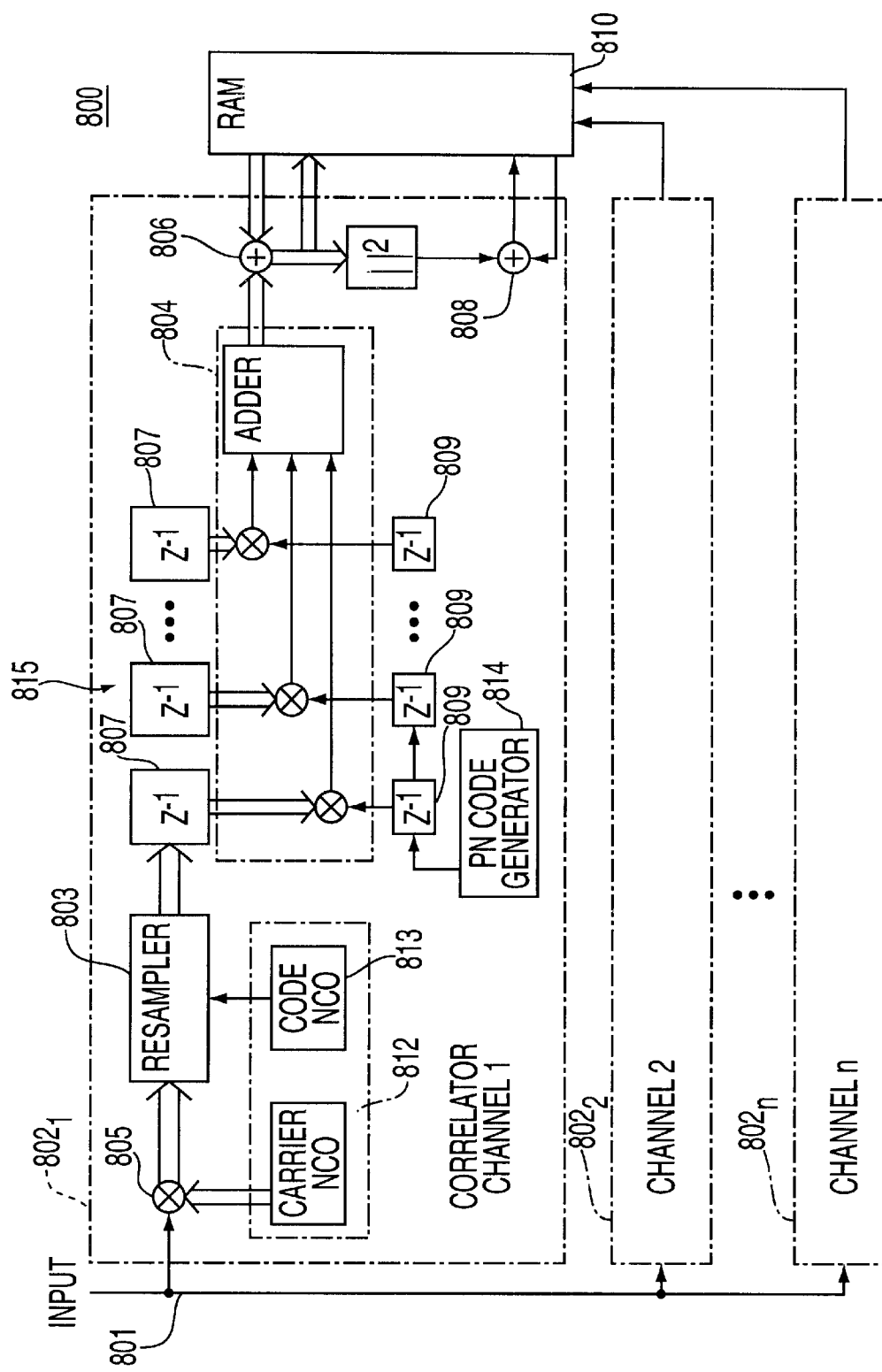
FIG. 8 depicts a functional block diagram of a hardware implementation of a parallel GPS correlator.

FIG. 8 depicts a functional block diagram of this aforementioned second embodiment of a parallel GPS correlator element 800 within a mobile device. The element 800 comprises a plurality of parallel correlator channels 802$_i$, where i is an integer. The correlator channels 802 are substantially identical to one another; therefore, the details of correlator channels 802$_i$ are described with respect to FIG. 8. In particular, IF input samples 801 are first multiplied using multiplier 805 by a complex exponential term to remove an IF carrier frequency. The complex exponential is generated by numerically controlled oscillator 812. The NCO frequency is set to the IF frequency, which is generally composed of a fixed term (due to the design of the RF front end), and a carrier frequency correction term as provided by the signal search step 406 or 412. The multiplication step generates a complex result, i.e., the result is composed of an in-phase term (generated by mixing with a cosine function of the carrier phase) and a quadrature term (generated by mixing with a sine function of the carrier phase). In FIG. 8, for clarity, the flow of complex values with in-phase and quadrature components are represented by double-lined arrows.

The carrier-corrected samples are resampled using resampler 803 in order to yield samples at the desired input rate for the correlation process. In one embodiment, the resampler 803 is implemented as an integrate and dump circuit which periodically provides a pre-summed value to the parallel correlator 815. The dump event of the resampler is controlled by a second NCO 813 that generates a sample signal that properly distributes the chips of the incoming PN modulation across the parallel correlator 815. The NCO value is programmed based on the expected pseudo-range rate of the incoming signal.

It should be noted that the digital circuit runs on a single clock, such that the time interval of an individual pre-sum in resampler 803 will always begin and end on a clock cycle. On an instantaneous basis, this will introduce variations in the sample timing relative to the incoming signal. These variations, however, cause only slight changes in the overall correlation process because the NCO will, on average, generate the correct sampling timing.

The outputs of the resampler 803 pass to correlator 815 which perform the task of calculating the convolution between the received signal and a set of reference waveforms for each satellite in view. Each channel 802 contains a plurality of delay units 807 and a large multiply-and-add logic block 804 that computes the correlation between a full epoch of input data 801 and the complete PN code sequence for the desired satellite. On each clock cycle, a new correlation result for a particular delay value is generated and stored in random access memory (RAM) 810. After a full epoch of clock cycles, the RAM 810 contains a complete set of correlation results for all delays. This array of results is the convolution between the input signal 801 and the reference waveform produced by a PN code generator 814.

In one embodiment, eight parallel correlator channels 802 are used, allowing simultaneous sensing of up to eight satellites in view. The size of each correlator 815 within each channel depends on the granularity required in the convolution result. A 2046-wide parallel correlator provides convolution results spaced at intervals of one-half of a PN code chip. This is adequate to detect and estimate the location of the true peak correlation, which will, in general fall between bins on the convolution.

The block search hardware 800 is designed to detect and measure extremely weak signals. Due to noise, interference, and cross correlation effects these low signal levels are not detectable through analyzing a single epoch of data. To enhance sensitivity, the block search hardware 800 integrates the results from hundreds of individual convolutions to generate a single composite convolution with improved signal to noise characteristics. Two types of averaging are performed: coherent averaging in coherent accumulator 806 and non-coherent averaging in non-coherent accumulator 808. The motivation for using a combination of coherent and non-coherent averaging is substantially the same as was described in steps 660 and 670 of method 600 in FIG. 6.

Coherent averaging is implemented by directly summing the results of multiple convolutions and using the RAM 810 to store intermediate results. As each correlation is computed, the result is added to an ongoing summation in the RAM 810 for that delay value. At the conclusion of the coherent averaging interval the RAM 810 holds a composite convolution result. One embodiment uses a nine epoch coherent averaging period (an epoch meaning a full cycle of the PN code). To further extend the averaging time, non-coherent averaging is used. Non-coherent averaging consists of summing the complex magnitudes of the individual convolution results to yield a composite result with improved signal to noise characteristics. The non-coherent averaging process builds upon the results of coherent averaging. As each coherent averaging interval ends, the resulting coherent average is magnitude-squared summed with an ongoing non-coherent averaging value stored in RAM 810.

This process runs for the desired total averaging interval, for example one second.

Before processing begins, each parallel correlator must be pre-loaded with the reference waveform. There are many possible ways to achieve this preloading. The waveforms for all 32 PN codes, for example, could be stored in hardware and selected via a multiplexer. Alternatively, the reference waveform could be stored in microprocessor ROM and loaded into the hardware at run time. In a preferred embodiment, the reference waveform is generated by PN code generator 814. During initialization of the correlator 815, this reference waveform is clocked in using delay units 809. A single PN code generator 814 can be used to load all eight correlators in sequence.

The Block Search hardware 800 includes a simple microprocessor, running a software program stored in memory. The software works in conjunction with the parallel GPS correlator to complete the GPS processing functions in the mobile device. One key responsibility of the software includes performing all initialization functions beginning with receipt of the initialization packet from the position server through to programming all necessary hardware elements such as NCO's and PN code generators. Another responsibility is managing the coherent/non coherent integration process through appropriate control of hardware interfaces, as well as implementing the peak identification process. The algorithms used for the latter purpose are substantially the same as those described in the Software Processing Algorithm description and illustrated in FIG. 7. Furthermore, the software includes implementing a peak measurement algorithm to precisely estimate the actual signal measurements based on the averaged correlation results accumulated in the on-chip RAM. The estimation process will use an interpolation/filtering algorithm that makes an estimate of the true peak location from nearby correlation results. Moreover, the software provides a communication protocol, such as a serial bus, to communicate with the host device.

The Block Search implementation described is one particular embodiment. As with many hardware signal processing systems, a broad array of hardware implementations are possible.

PALS Applications

For cellular phones to be location enabled, PALS technology is integrated into the circuit board and operating systems of the mobile device. The Software Approach described above requires integration of additional ROM/RAM memory, a GPS RF receiver and operating system modifications to the integral DSPs. The hardware approach described in FIG. 8, does not leverage the DSPs and insures no loss or interruption of voice processing capability during position related processing. This solution requires the installation of the PALS ASIC chip in lieu of leveraging the DSP.

For a 1.X way pager to be location enabled, (1.0 way pagers can be located via an autonomous/DGPS assist method only due to receive only operation), PALS technology is integrated into the hardware and operating protocols of the mobile device. Pagers do not have the powerful voice processing DSPs of cell phones and thus require a hardware solution similar to that described above. This includes integration of additional ROM/RAM memory, a GPS RF receiver and the PALS ASIC chip. The GPS receiver front end shares an antenna with the pager transceiver as well the power supply.

Wireless Internet devices include personal digital assistants, lap top personal computers, and hand held personal computers. These devices originally designed as personal information managers (PIM's) are evolving into palm/hand size mobile PCs and integrate PIM functions, word processing, spreadsheet, Internet browser and a wireless modem. Recent alignments within the wireless industry point to an eventual integration of voice and data creating an entirely new family of mobile telephony devices. Accurate device position is a valuable parameter for filtering location specific search results, providing real-time directions or locating people and assets. The Air -IP- Interface will easily support the half-duplex data transmission required by the PALS location solution. Assuming the device is delivered with a wireless modem, the PALS technology must by integrated into the hardware and operating system software. PCs have no DSPs and thus require an enhanced hardware solution similar to that described above. This includes integration of additional ROM/RAM memory, a GPS RF receiver and the PALS ASIC chip. The GPS front end will share the device power supply as well as the transceiver's antenna.

Another implementation of the wireless client/server based location device uses a single function, position device that acts solely as a location beacon and/or panic signal. No power hungry display or back light is provided. The device consists of a GPS RF receiver, pager transceiver, pager ASIC, PALS ASIC, RAM/ROM memory, power supply and antenna. This device will be locatable through a web portal or via stand alone applets. The express purpose of this class of location enabled device is person or asset tracking. No voice or text data communication is included. Such a device would be suited for (stolen) vehicle or employee tracking on a global scale.

Dialing 911 from most US based land-line telephones results in the call being switched (directed) to the predetermined Public Safety Answering Point (PSAP). A public safety answering point is manned by operators trained in dispatching emergency services. The existing wireline infrastructure includes the callers identification as well as location to assist the PSAP in deploying the necessary response. To date, the same emergency 911 call placed on a wireless device will not be routed to the appropriate PSAP. By imbedding a precisely calculated position along with the cellular phone owner's identification the PALS system will assist in routing 911 calls to the appropriate PSAP. A 911 call placed by a wireless device will then render the same response as that of the land line variety. The Location Routing technology will be transparent to the caller and require no additional keystrokes.

Regardless of the nature of the location request (Cellular 911, Internet via 2-way pager or PDA based location specific query) the client/server position solution relies on a series of timely data transactions. Once queried the Position Server sends a packet of information to the client. This information is known as the PALS initialization packet or PIP, this data is processed by the PALS block search ASIC or PALS software DSP based technology to yield Satellite PNCode Phases. These results are transmitted back to the server for accurate position calculation. Final position is then relayed to the querying party. The PIP contains the following data such as approximate location (300 mile radius) determined through a variety of means, known location of the RECEIVING base station, cellular/pager home area, previous solution assumption, limited subscription area or direct entry via keyboard (PDA/HHPC); timing data necessary to offset mobile device local clock to true GPS time and satellite orbit models/atmospheric corrections determined by the Position Server GPS network.

There are seven discrete transactions associated with locating a mobile device in the Enhanced 911 model. FIG.

10 depicts a functional block diagram of a system 1000 for transferring data in an emergency 911/cellular phone environment. Each step represents data exchange only, voice transactions are not detailed. A personal asset location system (PALS) request is initiated via a wireless carrier based on an approximate position of the cellular phone. Using path 1004, the centralized server 120 transmits the PALS initialization packet (PIP) reply back to the wireless carrier 1001 and the PIP is relayed through path 1006 to the cellular phone 1020. The cellular phone 1020 transfers the satellite PN code Phases from visible GPS satellites through path 1008 to the wireless carrier 1001. The wireless carrier 1001 forwards via link 1002 the satellite PN code phases to the centralized server 120.

Cell phones transceive voice and data differently based on the Air Interface. Analog phones use a method referred to as AMPS (Advanced Mobile Phone Service). Digital and PCS phones use varying technologies from TDMA to CDMA and combinations of all three. These are industry wide, open standards and therefore can be enhanced or modified by consortium agreement. In all cases a portion of the available bandwidth is compromised by the protocol overhead (this is the non-voice data used to identify the caller, control the power output, select transceiver channels, handoff calls cell to cell, etc.). This non-voice bandwidth will support the small packets of data required to determine the location of the mobile device.

The wireless industry is moving towards integrating an Air-IP-Interface. This will allow much more non-voice bandwidth for data such as the PIP or Geo-Coded location replies. PDAs (personal digital assistants) and HHPCs (hand-held personal computers) already allow Internet access via analog modem. Such a system will support GPS client-server data transactions immediately with no Air Interface modifications.

Another valuable function of the PALS E911 Location Solution is the virtual routing of these calls to the appropriate public safety answering point (PSAP) 1016. The centralized server 120 computes the cellular phone position from the satellite PN code Phases and transmits the cellular phone location back to the wireless carrier. Thus, the centralized server 120 returns a final position and in turn calculates the nearest or most appropriate PSAP 1016 from a known national database. Once relayed to the carrier this information allows the wireless call to be switched and connected to the PSAP for disposition. The wireless carrier, through link 1014, forwards the cellular phone location to a PSAP via a public switch telephone network (PSTN) 1022. The real time nature of these transactions makes the PALS E911 Location Solution transparent to the caller.

The PALS system leverages Internet technology to provide a ubiquitous media for hosting person and asset location services. The web site is the portal into web-based asset and people tracking services targeted to business and consumers. Through a standard Internet browser, customers are provided with simple user interfaces that allow them to locate their assets or loved ones equipped with PALS-enabled devices identified by user codes. The web site can also be programmed to provide tracking services for groups of assets.

For example, a business could program the site to locate and display the positions of an entire fleet of vehicles. Advanced features, such as scheduled reporting or alarms could also be incorporated into the web site. The use of the Internet for hosting position services contrasts sharply with today's proprietary tracking software systems. The combination of an Internet interface and a client-server positioning architecture provides great advances in performance and ease-of-use.

Figure 11:
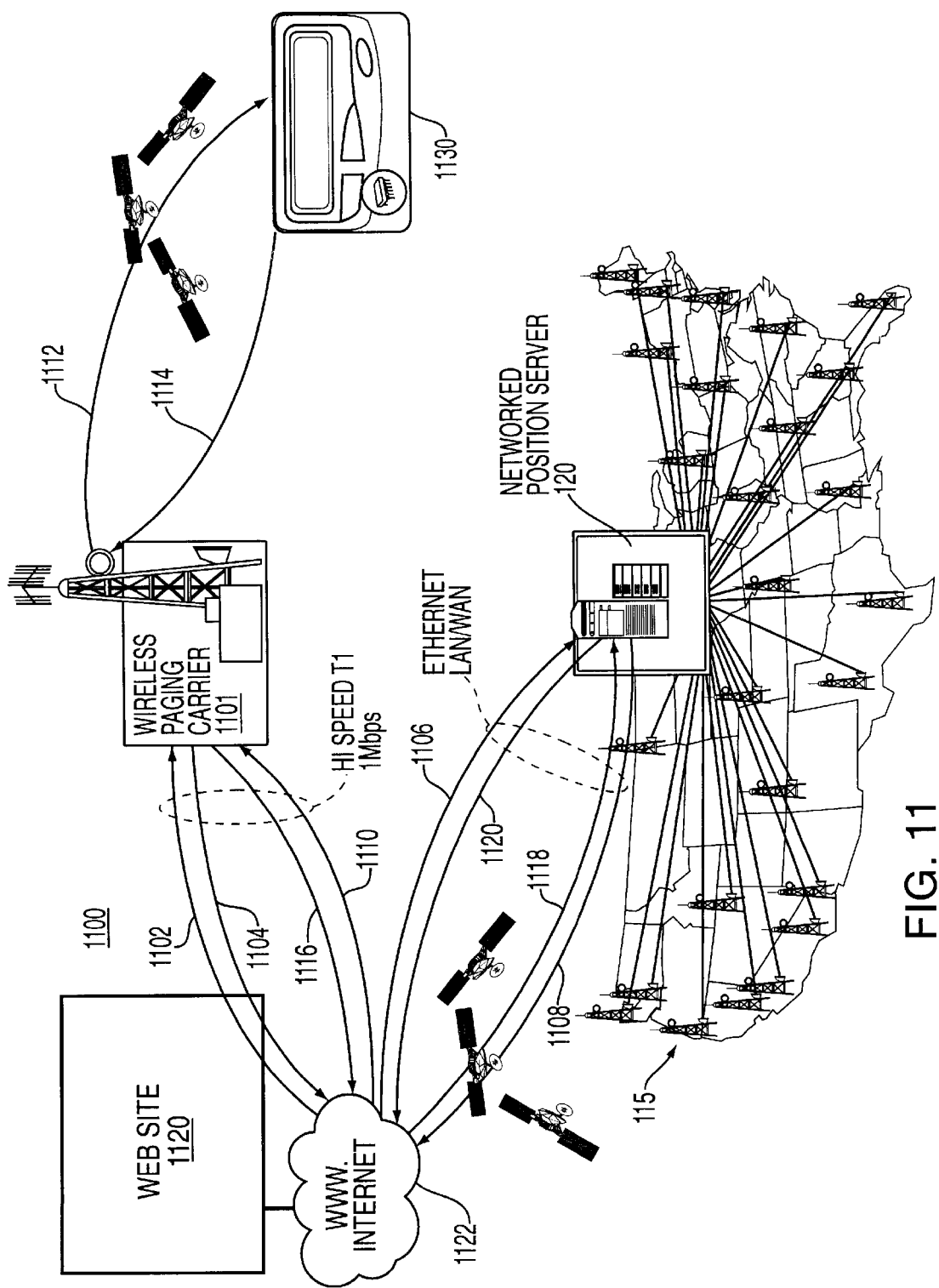
FIG. 11 depicts a functional block diagram of a system for transferring location data in a pager environment.

FIG. 11 depicts a functional block diagram of a system 1100 for transferring location data in a pager environment. There are ten discrete transactions associated with locating a mobile device in the Internet based pinging model. Each step represents data exchange only since voice is not transmitted. The nature of each node to node interface is indicated by dotted lines. This model stipulates the location query be generated from a remote user connected to the Internet. A query is generated at the web portal 1120 or relayed through the web portal by a PC based stand alone application. In either case a GUI (graphic user interface) will prompt the user for an identifying PIN of the mobile device 1130. The results of the location query (or ping) will be a geo-coded position displayed on a scale map with pertinent cross streets and landmarks. The mobile device may or may not prompt the wearer to the pinging process.

Specifically, in response to a query sent via path 1102, the wireless paging carrier responds (path 1104) over the Internet 1122 with an approximate position and the Internet routes the PALS initialization packet (PIP) based on the known approximate location to the centralized server 120. The centralized server 120 replies to the PIP request via path 1108 and the request is sent via the Internet to the wireless carrier along path 1110. The wireless carrier 1101 receives the request for an outgoing page containing the PALS initialization packet and, through path 1112, the wireless carrier forwards the page containing the PIP to the pager. The pager replies through path 1114 back to the wireless carrier with the satellite PN code Phases for the GPS satellites that are visible to the pager. The wireless carrier relays through path 1116 the satellite PN code phases to the web site, and the web portal forwards through path 1118 the satellite pn code phases to the centralized server 120. The centralized server computes the location of the pager and forwards the information through path 1119 to the web portal 1120 for geo-coding.

The pagers transceive data differently based on the paging protocol. These are manufacturer specific standards and therefore are less likely to be modified for application specific reasons. Unlike cellular air interfaces, paging protocols are half duplex architecture and support data transmission in lieu of more bandwidth demanding voice communication. The data specific nature of 2-way pagers combined with the low power requirement makes them an ideal wireless location platform. A small footprint and tiny integral antenna allow the device to worn by a person or implanted in an asset without impeding normal function. Two way paging communications may involve some latency of data due to the wide geographic footprint, satellite up and down links and message queuing. The PALS location solution (as described previously) will not lose accuracy due to normal queuing delays.

As described above the pinging visitor to the PALS location portal web site will be prompted to enter the mobile clients PIN (Personal Identification Number). The results of the query will be displayed in a number of user configurable formats. Some outputs will necessitate multiple pings and additional processing time. Few consumers can benefit from position information displayed as numerical latitude and longitude. The position information becomes valuable when presented in context. For example, latitude, longitude and altitude for course plotting or integration to client mapping software; Geo-coded (variable scale) local map showing cross street/landmark; geo-coded (variable scale) USGS topographical map showing location relative to native geography; positions rendered on 3-D virtual images of cities or other features; nearest street address, city, state and zip code;

and routing directions to located destination; optional speed and heading parameters.

For more demanding asset tracking uses a configurable stand-alone application is provided. The applet facilitates tracking multiple clients (people or assets) at variable intervals. Client ID and position data may be displayed and updated (in previously defined output formats) in real-time or archived for post processing. The applet will access the Position Server via the internet and the PALS Web Portal or thru the downloadable applet and a dedicated dial-up wireline connection.

Wireless Internet Devices include Personal Digital Assistants, Hand Help/palm based Personal Computers and Lap Top Personal Computers. These wireless browsers allow mobile Internet connectivity via traditional modem/cellular protocol interface or through emerging wireless IP air interfaces. The implications of enabling such devices with the PALS location solution are outlined above. The software running on these devices can either take the form of a generalized browser, which relies on the wireless Application Service Provider for application specific user interactions, or a special purpose dedicated application running on the wireless mobile device.

Figure 12:
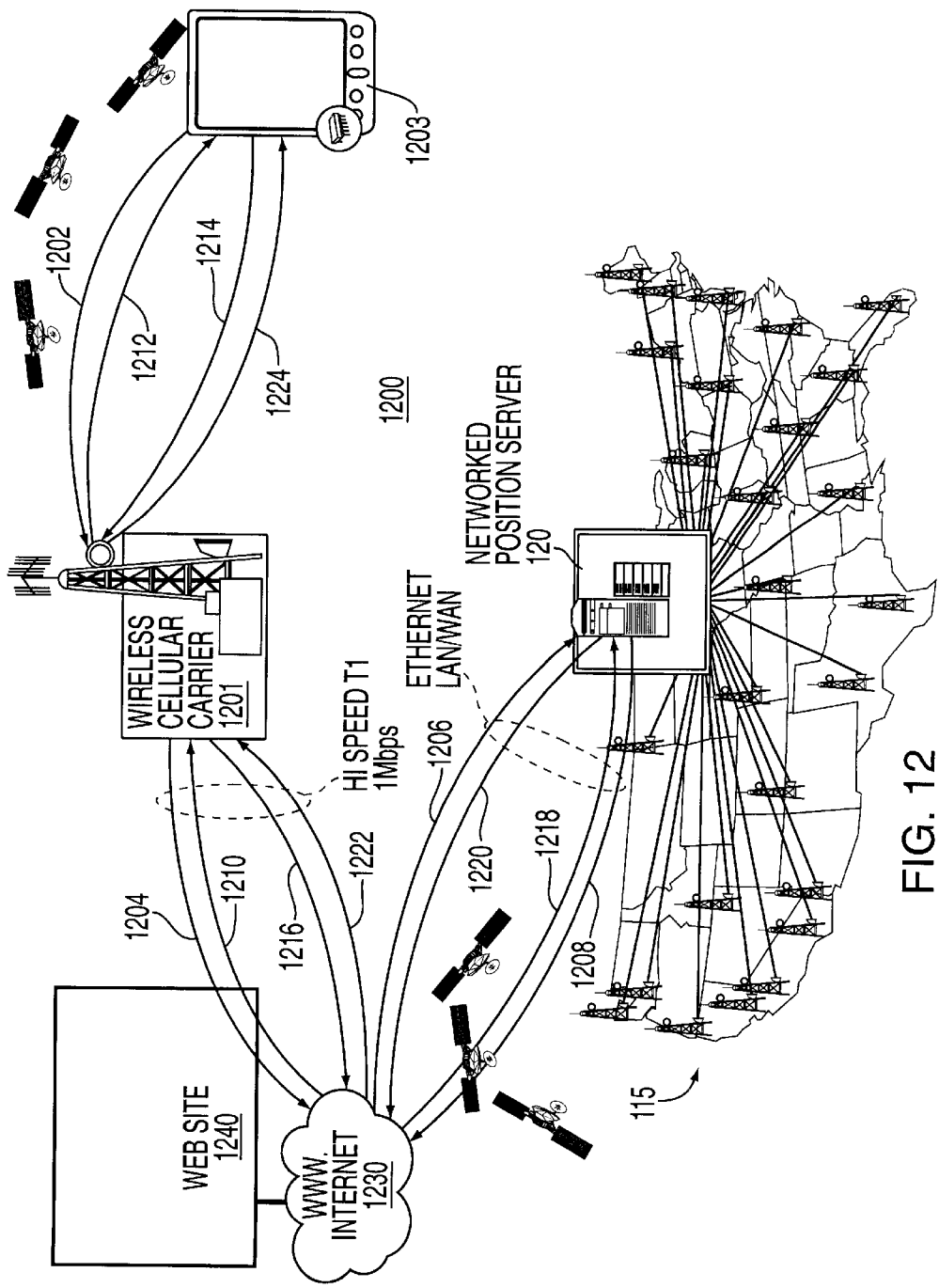
FIG. 12 depicts a functional block diagram of a system for transferring location data in a wireless browser environment.

There are thirteen discrete transactions associated with the client (PDA, HHPC, LTPC) initiated location query. FIG. 12 depicts a functional block diagram of a system 1200 for transferring location data in a wireless browser environment. Each path represents data exchange only since voice is not transmitted. The nature of each node to node interface is indicated by dotted lines.

This model stipulates the location query be generated from the client (mobile device) connected by a wireless protocol to the Internet. The query may be generated via the mobile browser web portal or relayed thru the web portal by the PDA resident applet. In either case, a GUI (graphic user interface) prompts the user for an identifying PIN of the mobile device. The results of the location query (PING) is a geo-coded position displayed on a scale map with pertinent cross streets and landmarks.

The system 1200 begins with a position query on path 1202 from a PDA applet thru the wireless carrier 1001. The carrier sends via path 1204 the position query over the Internet 1230 to the web portal 1240 where the web site authorizes and requests via path 1206 a PALS initialization packet (PIP) from the centralized server 120. The centralized server 122 sends via path 1208 a PIP reply over the Internet to the web portal where the PIP reply to the applet is forwarded via path 1210 to the carrier 1201. The carrier sends via path 1212 the PIP reply to the applet to the PDA, and the PDA sends via path 1214 the visible GPS satellite PN code phases to the position server via the wireless carrier. The satellite PN code phases are sent via path 1216 across the Internet 1230 and are routed to the centralized server via path 1218. The centralized server sends via path 1220 the final raw positions of the PDA across the Internet to the web portal 1240 where the raw position with additional location specific data is sent via path 1222 to the carrier. The position with additional location specific data is sent via path 1224 to the browser applet in the PDA 1203.

A PALS Location Solution enabled Wireless Internet Device permits web based queries using the mobile devices real-time location as a search filter that insures search results will reflect only those lying within a specified radius of the mobile device. This will allow locally pertinent data (addresses or telephone numbers), maps, landmarks, places of business or current-position sensitive directions to be viewed via the mobile browser.

Although various embodiments which incorporate the teachings of the present invention have been shown and described in detail herein, those skilled in the art can readily devise many other varied embodiments that still incorporate these teachings.

What is claimed is:

1. A method of remotely calculating position of a Global Positioning System (GPS) device, the method comprising:

providing reference stations, the reference stations configured to provide GPS information;

providing a server in communication with the reference stations, the server configured to produce a wide area pseudo-range model in part from the GPS information provided by the reference stations;

communicating pseudo-noise code phase information from the GPS device to the server, the pseudo-noise code phase information provides a fractional part of a pseudo-range; and calculating a position for the GPS device from the pseudo-noise code phase information and the wide area pseudo-range model.

2. The method of claim 1 wherein the wide area pseudo-range model is a real-time, wide area pseudo-range model.

3. The method of claim 1 wherein the fractional part of the pseudo-range comprises at least a sub-millisecond portion.

4. The method of claim 3 wherein the step of calculating the position comprises:

obtaining a location estimate for the GPS device; and determining sets of millisecond integers in response to the wide area pseudo-range model, the at least sub-millisecond portion and the location estimate.

5. The method of claim 4 wherein the step of determining the sets of millisecond integers comprises:

changing the location estimate; and redetermining the sets of millisecond integers until a set of millisecond integers solves for the position of the GPS device.

6. The method of claim 5 wherein the step of determining the sets of millisecond integers comprises:

computing respective sets of residuals for the sets of millisecond integers; and eliminating sets of the sets of millisecond integers in response to the residuals.

7. The method of claim 1 further comprising:

time stamping by the server for GPS measurement made at the GPS device; and providing a latency estimate owing to communication delay between at least a portion of a communication link between the GPS device and the server.

8. The method of claim 7 wherein the step of calculating the position comprises:

obtaining a location estimate for the GPS device; and determining sets of millisecond integers in response to the wide area pseudo-range model, the at least sub-millisecond portion and the location estimate.

9. The method of claim 8 wherein the step of obtaining the sets of integers comprises:

changing at least one of the location estimate and the latency estimate; and redetermining the sets of millisecond integers until a set of millisecond integers solves for the position of the GPS device.

10. The method of claim 9 wherein the step of determining the sets of millisecond integers comprises:
   computing respective sets of residuals for the sets of millisecond integers; and
   eliminating sets of the sets of millisecond integers in response to the residuals.

11. The method of claim 1 wherein the step of calculating the position comprises using a latency error model.

12. The method of claim 1 wherein the step of calculating the position comprises:
   subtracting measured code phases from the wide area pseudo-range model to provide range residuals; and
   eliminating sets of integers in response to the range residuals.

13. The method of claim 1 wherein the step of calculating the position comprises:
   obtaining an estimated location of the GPS device;
   obtaining an estimated latency for at least a portion of a communication delay between the GPS device and the server;
   obtaining an estimated common mode error; and
   updating at least one of the estimated location, the estimated latency and the estimated common mode error.

14. The method of claim 13 wherein the step of updating comprises updating each of the estimated location, the estimated latency and the estimated common mode error.

15. A method of remotely calculating position of a Global Positioning System (GPS) device, the method comprising:
   providing reference stations for obtaining satellite information;
   providing a server configured to receive the satellite information from the reference stations, the server configured to produce a wide area pseudo-range model responsive to the satellite information;
   communicating a sub-millisecond portion of pseudo-noise code phase information from the GPS device to the server;
   obtaining sets of values in response to the sub-millisecond portion of the pseudo noise code phase information;
   determining a latency model in at least partial response to communication delay between the server and the GPS device;
   calculating range residuals in response to the sets of values;
   providing a position equation;
   improving the position equation with the latency model and the range residuals; and
   calculating a position for the GPS device using the position equation as improved.

16. The method of claim 15 further comprising:
   providing a database, the database comprising a terrain model, the database accessible by the server; and
   using the position calculated for the GPS device in the terrain model to provide an altitude for the GPS device; and
   incorporating the altitude of the GPS device into the position equation.

17. The method of claim 16 wherein the GPS communicates with the server via a cellular base station.

18. The method of claim 17 further comprising:
   obtaining a time-of-arrival measurement at the GPS device from the cellular base station; and
   incorporating the time-of-arrival measurement into the position equation.

19. The method of claim 17 further comprising:
   providing an angle-of-arrival measurement from the GPS device to the server; and
   incorporating the angle-of-arrival measurement into the position equation.

20. A method of remotely calculating position of a Global Positioning System (GPS) mobile device, comprising:
   providing reference stations configured to provide GPS information;
   providing a server in communication with the reference stations configured to produce a wide area pseudo-range model in part from the GPS information;
   communicating only sub-millisecond pseudo-noise code phase information from the GPS device to the server; and
   calculating a position for the GPS device from the sub-millisecond pseudo-noise code phase information and the wide area pseudo-range model.

* * * * *

UNITED STATES PATENT AND TRADEMARK OFFICE
CERTIFICATE OF CORRECTION

PATENT NO. : 6,484,097 B2 Page 1 of 1
DATED : November 19, 2002
INVENTOR(S) : Donald L. Fuchs, Charles Abraham and Frank van Diggelen It is certified that error appears in the above-identified patent and that said Letters Patent is hereby corrected as shown below:

<u>Title page,</u>
Item [56], References Cited, U.S. PATENT DOCUMENTS, please change "6,051,018" to -- 6,061,018 --.

<u>Column 12,</u>
Line 2, beginning with "$x$ is the", should be a new paragraph and not part of condition $y$ of the paragraph above.

<u>Column 22,</u>
Line 39, beginning with "By imbedding a precisely", should be a new paragraph.

Signed and Sealed this

Twenty-ninth Day of April, 2003

JAMES E. ROGAN
*Director of the United States Patent and Trademark Office*